United States Patent
Chalupa et al.

(10) Patent No.: US 6,419,426 B1
(45) Date of Patent: Jul. 16, 2002

(54) NUMERIC CONTROLLED DRILLING JIG-MULTIPLE-AXIS AEROSPACE DRILLING MACHINE

(75) Inventors: Ed Chalupa, Plano; Gary Williams, Dallas, both of TX (US)

(73) Assignee: Advanced Integration Technology, Inc., Plano, TX (US)

( * ) Notice: Subject to any disclaimer, the term of this patent is extended or adjusted under 35 U.S.C. 154(b) by 0 days.

(21) Appl. No.: 09/898,786

(22) Filed: Jul. 3, 2001

Related U.S. Application Data

(60) Provisional application No. 60/215,942, filed on Jul. 5, 2000.

(51) Int. Cl.[7] .............................................. B23B 35/00
(52) U.S. Cl. ........................... 408/1 R; 408/3; 408/13; 408/16; 408/237
(58) Field of Search .............................. 408/1 R, 3, 16, 408/13, 88, 234, 236, 237; 409/235; 901/41

(56) References Cited

U.S. PATENT DOCUMENTS

| | | | | |
|---|---|---|---|---|
| 4,761,101 A | * | 8/1988 | Zettl | 408/6 |
| 4,993,913 A | * | 2/1991 | Ohtsuki | 414/729 |
| 5,626,445 A | * | 5/1997 | Nachbar et al. | 408/1 R |
| 5,659,480 A | * | 8/1997 | Anderson et al. | 364/474.28 |
| 5,836,068 A | * | 11/1998 | Bullen et al. | 29/430 |
| 6,129,031 A | * | 10/2000 | Sarh et al. | 112/470.13 |
| 6,158,929 A | * | 12/2000 | Fisher | 408/1 R |

* cited by examiner

Primary Examiner—Daniel W. Howell
(74) Attorney, Agent, or Firm—Black Lowe & Graham PLLC

(57) ABSTRACT

An improved drilling machine and drilling method will allow rapid configuration and calibration. The drilling machine is small, mobile, and possesses extensive computing power to download positions of hole sites and to control the positioning of the end effector. The mini-driller conforms to various jig configurations regardless of the program model or position on the wing. In short, the controller for the mini-driller quickly orients the machine, downloads the hole sites appropriate to the model under construction and determines with accuracy the mini-driller's precise location in relation to the work piece. A graphic user interface allows the operator to read the projected position of the hole sites, as downloaded from the Numeric Control Server, off of the graphic user interface and to make ad hoc corrections to the projected hole sites.

21 Claims, 27 Drawing Sheets

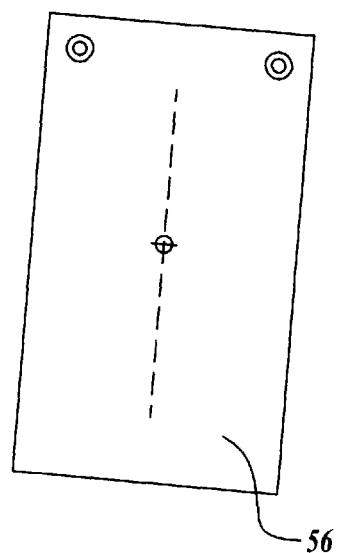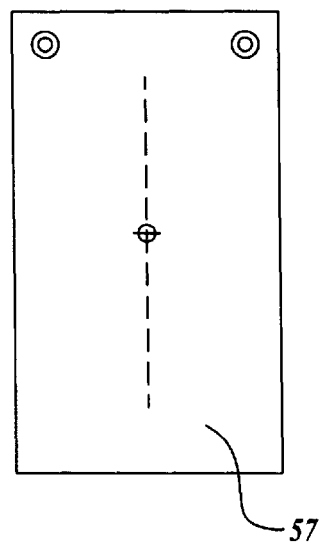
*Fig. 13a.*      *Fig.13b.*

*Fig. 15.*

X&Y Position Calc's — 315 / 317

| Item | X | Y |
|---|---|---|
| Raw Pos | 0.0000 | 0.0000 |
| Nom. Offset | 0.0000 | 0.0000 |
| Cal. Offset | 0.0000 | 0.0000 |
| Vector Offset | Xxxx.xxxx | Xxxx.xxxx |
| Polarity | 1.0 | 1.0 |
| Zone Offset | 0.0000 | 0.0000 |
| Final Pos | 0.0000 | 0.0000 |

A&B Angle Calc's — 316

| Item | A | B |
|---|---|---|
| Raw Angle | 0.0000 | 0.0000 |
| Nom. Offset | 0.0000 | 0.0000 |
| Polarity | 1.0 | 1.0 |
| Final Angle | 0.0000 | 0.0000 |

Z Position Calc's — 319

| Item | Z |
|---|---|
| Raw Pos | 0.0000 |
| Nom. Offset | 0.0000 |
| Comp. Factor | 0.0000 |
| Clamp Adj. | Xxx.xxxx |
| Cntr Sink Adj. | Xxx.xxxx |
| Polarity | 1.0 |
| Final Pos | 0.0000 |

Hole Position Calc's — 318

| Item | X | Y |
|---|---|---|
| Hole Pos | Xxxx.xxxx | Xxxx.xxxx |
| S & C Adj. | Xxxx.xxxx | Xxxx.xxxx |
| Final Pos | Xxxx.xxxx | Xxxx.xxxx |

Servo | Dig I/O | Positions | S. & C. | Menu

Mode User Control — Zone 0 — Wed 12-06-2000 16:24:25 — diag_pos — TT

DVT Scan and Correct

DVT Settings

| Type Name | |
|---|---|
| Exposure | 0.0000 |
| Gain | 0.0000 |
| # Samples | 0 |
| Anti-blooming | ✗ |
| DVT Address | 0 |

Current Camera Data

| | |
|---|---|
| Delta X Value | 0.0000 — 321 |
| Delta Y Value | 0.0000 — 322 |

Transformation Information

| X Offset | 0.0000 |
|---|---|
| Y Offset | 0.0000 |
| Z Offset | 0.0000 |
| Rotation Angle | 0.0000 |
| Rotation Vector I | 0.0000 |
| Rotation Vector J | 0.0000 |
| Rotation Vector K | 0.0000 |
| RMS | 0.00000000 |

| Cntl Points | X | Y | Z |
|---|---|---|---|
| Nominal | 0.0000 | 0.0000 | 0.0000 |
| Delta | 0.0000 | 0.0000 | 0.0000 |

Scroll Points

| 1st | 4 | ◀ | ▶ |

S. & C. | Positions | Dig I/O | Servo

Mode | User Control | Menu

Zone | 0 diag_s_c | TT | Wed 12-06-2000 16:24:53

*Fig. 16.*

| Axis | Ready | Enabled | In Pos | Motion | Reference Source | + Limit | Home | - Limit |
|---|---|---|---|---|---|---|---|---|
| X | ☐ | ☐ | ☐ | ☐ | Invalid | ☐ | ☐ | ☐ |
| Y | ☐ | ☐ | ☐ | ☐ | Invalid | ☐ | ☐ | ☐ |
| Z | ☐ | ☐ | ☐ | ☐ | Invalid | ☐ | ☐ | ☐ |
| A | ☐ | ☐ | ☐ | ☐ | Invalid | ☐ | ☐ | ☐ |
| B | ☐ | ☐ | ☐ | ☐ | Invalid | ☐ | ☐ | ☐ |
| Spindle | ☐ | | | | | | | |

| Axis | Servo Position | Follow Error | Axis State & Substrate | Servo State/Source |
|---|---|---|---|---|
| X | 0.0000 | 0.000000 | NO DATA!! | NO DATA!! |
| Y | 0.0000 | 0.000000 | NO DATA!! | NO DATA!! |
| Z | 0.0000 | 0.000000 | NO DATA!! | NO DATA!! |
| A | 0.0000 | 0.000000 | NO DATA!! | NO DATA!! |
| B | 0.0000 | 0.000000 | NO DATA!! | NO DATA!! |
| Spindle | 0 | 0.000000 | NO DATA!! | NO DATA!! |

Zone 0 | Mode User Control | Menu

Wed 12-06-2000 16:24:00

Servo | Dig I/O | Positions | S. & C.

4 diagsrvo | TT

*Fig. 18.*

CMD_EDIT

N/C Program Override

| Register | New Value | Override | Register | Toggle Value | Override |
|---|---|---|---|---|---|
| Spindle RPM | 3850 | ✓ | Coolant | Mist | ✓ |
| Feed Rate | 0.0000 | | Spindle | ON | ✓ |
| Feed Depth | 0.2300 | ✓ | Drill Mode | Fixed | |
| Fast Feed Depth | 0.0000 | | Feed Mode | IPR | |
| Retract Plane | 0.0000 | | | | |
| Clamp Force | 0 | | | | |

[ Accept ]  [ Cancel ]

NUMERIC CONTROLLED DRILLING JIG-MULTIPLE-AXIS AEROSPACE DRILLING MACHINE

RELATED APPLICATIONS

This application claims priority to the application Ser. No. 60/215,942, filed Jul. 5, 2000, and entitled, "NUMERIC CONTROLLED DRILLING JIG-5-AXIS AEROSPACE DRILLING MACHINE."

BACKGROUND OF THE INVENTION

A modem commercial aircraft is very big. A Boeing 747-400, in its cargo configuration, for example, can hold aloft a cargo of 6,025 ft$^3$ (170.5 m$^3$), the equivalent of 30 LD-1 containers. Wings of just 211 feet 5 inches (64.4 m) hold a maximum dead-weight load of 875,000 lb (396,890 kg) aloft in flight. The construction of such a large and complex machine is a daunting task. Designers of such aircraft chose to divide the task into the construction of subassemblies, bringing the subassemblies into a whole later in the construction process.

There are several major subassemblies in the modem commercial airframe. The designers select the division lines between subassemblies to segregate assemblies into portions whose geometric configuration allows for rapid fabrication. They define these subassemblies to include complete groups of parts known as families.

A family of parts is any group of parts that do not vary greatly from one to the next, i.e. the dimensions of parts across the family remain relatively the same, one to the other, with variations in length, width or height. A good example of such a family would be wing ribs. The wing rib at the root of the wing and the tip of the wing are, basically, the same configuration, an airfoil. They vary only in length, width, and height, when compared to one another. Other such families include wing ribs, leading and trailing edge ribs on the wings and on the horizontal and vertical stabilizers, horizontal and vertical stabilizer ribs, body panels, fuselage frames, floor beams and miscellaneous subassemblies.

Manufacturers of modern airframes prefabricate numbers of subassemblies or workpieces on distinct fixtures known as jigs. These jigs exploit the similarity of the family of parts that comprise the assembly. To place and to fasten the various parts within the confines of the jig has traditionally required tooling to locate and to manually drill the holes necessary. Tooling for wing assembly, for example, is generally a plate of either metal or a composite of metal and various thermoplastics. Such plates are indexed either to a fixed point on the work piece or on the fixed assembly jig in order to precisely locate the sites for the holes. Additionally, the tooling or template guides the drill to the hole site in order to assure that the hole is drilled perpendicular to the surface. The maximum fastening strength occurs when the holes are precise circles. Slightly skewing the drill, away from perpendicular to the surface, results in oval holes that are larger than the inserted fastener. Extra space in the hole allows the fastened parts to work, that is, to move slightly. Working fatigues the joint.

Tooling, when new, does produce precisely located and properly angled holes. Placement of the tool on the jig or work piece causes wear on the indexing surfaces. Drilling in the tool causes wear within the hole on the template. Over time and with use, the wear becomes significant. The maximum wear that may be present without rendering the tool or template useless is termed tolerance.

The wear in a single tool or template does not complete the definition of the problem. In the traditional manner of assembly, each part has required its own tooling. In relating one part to another on the workpiece, the error introduced by inconsistencies of the tooling tends to mount up. The assembly technician who places part A on the workpiece does so with such errors as are inherent in the part A tool. Similarly, the assembly technician places part B with the errors inherent in the part B tool. The spatial relation of part A to part B is subject to both sets of errors. Because these errors cumulate, tolerances within a single tool or template must be much smaller than the total displacement of a hole site that might be acceptable.

In order to minimize the errors in part placement, the builder must subject the tooling to periodic calibration and maintenance. Continual calibration and maintenance of the figuring tooling, which can experience very hard usage in the factory, represents an immense expenditure of labor. Where such tooling indexes to the fixed assembly jig, as most tooling does, the calibration may include the calibration and routining of the fixed assembly jig. This calibration and routining of the jig prevents its use in production. Stopping production is expensive.

The problem is not trivial. An airplane requires a large number of holes—250,000 to 400,000 for fighter aircraft—two to three million for commercial airplanes. The Boeing 737-400 airplane requires holes to accommodate approximately 1,191,600,000 bolts and rivets; each fastener requiring drilling at least two surfaces, e.g. skin to ribs.

To respond to these shortcomings in traditional tooling, airplane manufacturers have sought to automate the drilling of these holes. Numeric definitions of the precise locations of hole sites come from the extensive drawings of the airplane stored in Computer Assisted Drafting (CAD) programs used to design the airplane. Airplane builders have sought several means of deriving precise locations for holes and then commanding a robotic driller to place them. Before the instant invention, such automated placement and drilling of holes has been limited in its success.

The most significant of the early approaches to the problem was the Huber, et al. U.S. Pat. No. 3,973,859, issued in Aug. 10, 1976. Huber teaches a monolithic automated drilling system. The Huber machine was, itself, as long as the work piece. Installation fixes this huge drilling machine in relation to the fixed assembly jig. The machine comprises a frame with freedom of movement along the length of the work piece (X-axis). Within the frame, the drilling spindle assembly can move upward and downward (Y-axis) and the spindle has an actuating piston that extends the drill toward the work piece (Z-axis). A spherical bearing carries the drill spindle with actuators and allows articulation in the either of two planes analogous to either pitch (A-axis) movement or yaw movement (B-axis) within the spherical bearing. This movement allows the positioning of the axis of the drill spindle perpendicular to the surface of the work piece.

While the Huber machine taught a very mobile drill spindle with means to position perpendicularly to the work piece surface, it was very large, very expensive, and incapable of accommodating changes to the working envelope. Out of necessity, fixing the Huber machine to floor of the construction facility maintains the Huber machines rough calibration to the fixed assembly jig. Because of this fixation, the builder accommodates changes in the work piece design by tearing down and rebuilding the machine in a location determined by the new design. Only one Huber machine can work on any one assembly of the airplane thereby limiting the speed of production.

The Murray, et al., U.S. Pat. No. 4,752,160, issued on Jun. 21, 1988 teaches an additional defect in the Huber machine. Murray refines the spherical bearing controlling α- and β-axes movement of the drilling spindle. In Huber, the spindle moves along the α- and β-axes by rotating around a point generally near the center of the spindle. Such movement displaces the point where the drill bit meets the work piece surface in the X-and Y-axes respectively. Murray refines Huber by shifting the point of rotation to that point where the drill meets the work piece surface. Murray accomplishes this shifting of the rotation point by employing large arcuate bearings that permit the cutting tool to rotate through a conical section having its vertex at the cutting point of the tool as a part of the spindle carriage. While cumbersome, the Murray machine mechanically achieves precision that the Huber machine cannot.

These means of automated drilling are still cumbersome, monolithic, inflexible, and expensive. Both Huber and Murray suggest that the solution will encompass control in as many as five-axes in order to assure roundness of drilled holes. Similarly, the mechanical means of controlling movement of the drill spindle such as the teaching of Murray, add to the complexity, weight and size of machines necessary for multi-axis numerically controlled or computer controlled drilling systems. However, prior art systems that incorporate computerized numerical-control have generally been highly expensive, fragile and difficult to hold in a proper position. Therefore, it should be apparent that a need has existed for a computerized numerically controlled drilling system that may be simply and accurately operated in multiple axes of motion and is smaller, more flexible, more easily deployable and more adaptable to changes in the design of the work piece. Such a driller could eliminate the need for completely separate drilling machines for each aspect of each assembly. It would also reduce the cost associated with fixture modification necessitated by assembly design changes, reduce the lead time to process new assemblies into production or introduce changes and reduce the level of skilled labor required to refer to drawings to set up parts in the fixtures and perform high-quality fastening.

SUMMARY OF THE INVENTION

BRIEF DESCRIPTION OF THE DRAWINGS

The preferred embodiment of the present invention is described in detail below with reference to the following drawings.

FIGS. 13a and 13b portray the mini-driller's capacity to correct for "skewedness" of the work piece to the mini-driller;

FIG. 15 portrays the application of calibration correction on the hole location screen of the mini-driller as displayed on the graphic user interface;

FIG. 16 portrays correction based upon the perceived displacement of known hole sites by Disruptive Virtual Technology™ camera sensor;

FIG. 18 portrays the actuator movement necessary for precise placement of a hole interpreted from a single script description;

FIG. 24 portrays the display by the graphic user interface, as the operator will use the same to override the programmed values sent to the mini-driller;

FIG. 26 portrays the display by the graphic user interface, as it is used to manage the passwords of mini-driller users;

DETAILED DESCRIPTION OF THE PREFERRED EMBODIMENT

Figure 1:
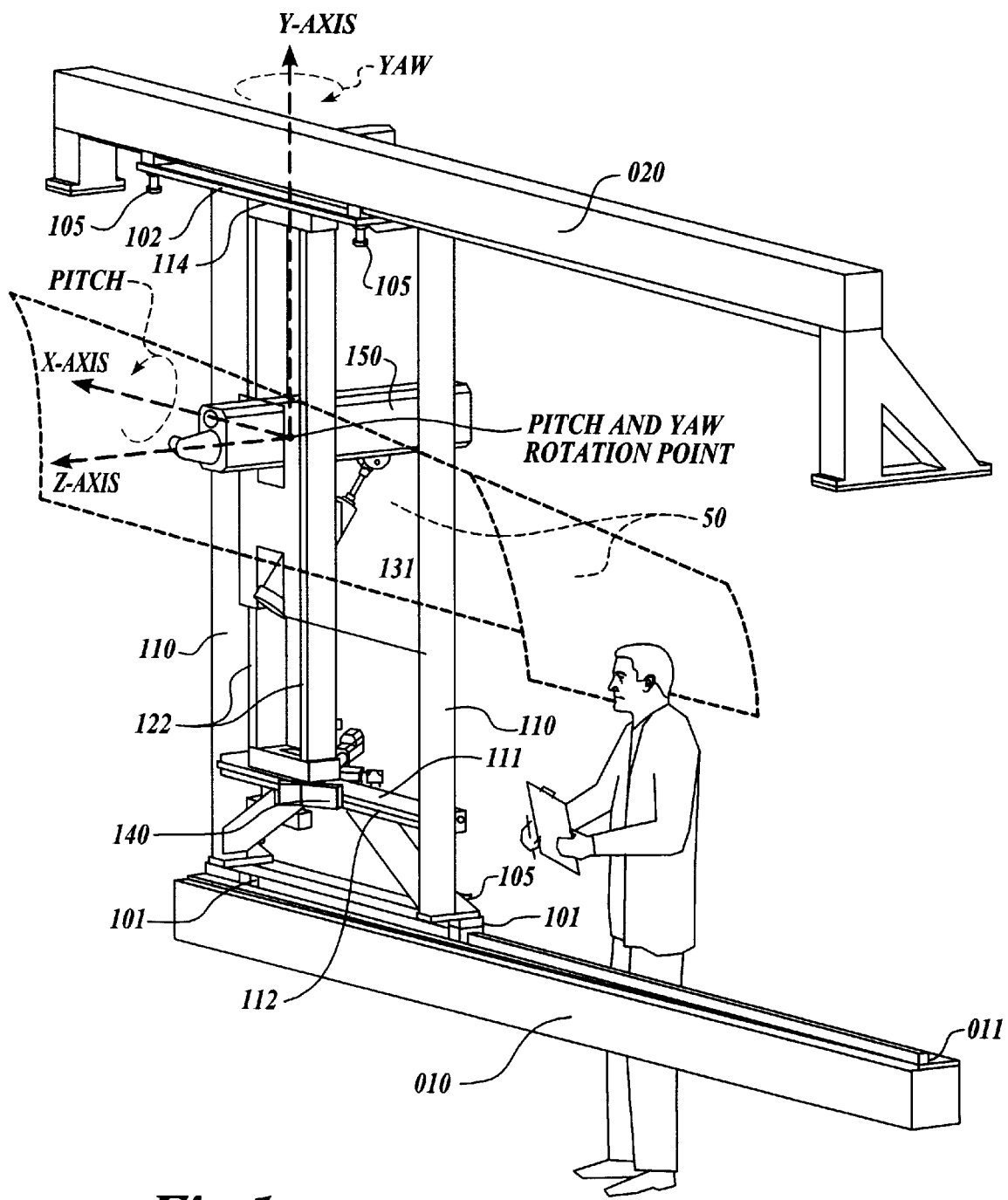
FIG. 1 portrays the mini-driller in place on a portion of the fixed assembly jig specifically displaying the size of the mini-driller and its attachment points on the fixed assembly jig.

The present invention, known as a mini-driller, combines a powerful real-time controller with a end effector mounted in a weldment frame articulated by suitable actuators effecting precise controlled movement of the spindle through a multiplicity of axes, in this illustrated embodiment, through five defined axes. One skilled in the art will readily perceive that one might use the same inventive method and apparatus for control in as few as three axes, or as many as might be necessary. The real-time controller also directs the speed of the drill spindle and the application of coolant. The controller has the ability to discern from reference features mounted on the fixed assembly jig, the invention's precise location on that jig. The fixed assembly jig is not, however, necessary.

By virtue of the camera and other sensing means, the mini-driller can locate itself in three-dimensional space in relation to the workpiece. Thus, where the distance is appropriate, the operator can wheel the mini-driller, placing it on the floor either under or alongside the workpiece, will allow the mini-driller to locate and to drill holes. Where the driller is not able to discern its position by virtue of landmarks on the workpiece, the operator can, by use of the pendant, enter the zone and location of the mini-driller. In addition, the invention, itself, calibrated within the weldment frame, corrects the position of the spindle in relation to the work piece, thereby precisely locating each hole drilled.

This controller is the locus of the ability of the mini-driller to locate and orient itself in space relative to the workpiece. This ability allows the manufacture to bring the driller to the workpiece rather than workpiece to the driller, as in prior construction. It allows the mini-driller to operate in various locations along the workpiece, on any of several workpieces, or to allow pairs or groups of mini-drillers to work on a single workpiece in distinct locations. In turn, this allows a manufacturer to marshal his mini-driller resources on a particular subassembly as will allow the speediest completion of a single airframe, or, alternately as will allow the most efficient production of several airframes, as the manufacturers needs dictate.

Rather than requiring the scrapping of drilling machinery with the discontinuation of a model or a derivation of a model, the controller allows the manufacturer to merely change and routine the fixed assembly jig. The fixed assembly jig is not necessary. All that is necessary is a steady platform for the mini-driller as with the weldment frame. The capability of the controller allows it to locate itself and, therefore, does not rely upon the rigidity of a jig for fixing its location in space. The controller receives instruction from the Numeric Control server and can effect those instructions from its position on the changed and routined fixed assembly jig. By such means, lead-time on modifications or changes to designs is held to a practical minimum. Indeed, much of the overhead for prototyping can be eliminated since the jig assembly expense can be minimal.

In order to demonstrate the flexibility of the invention, the applicant chooses to discuss the use of the mini-driller drilling wing spars; such use only demonstrates the flexibility of the invention. Nothing prevents its use in drilling parts of the fuselage or on the stabilizer or, indeed, on any other assembly. The discussed use on the spars and wings makes evident the configurability of the mini-driller across drilling zones and in different orientations. This same configurability allows use wherever the work piece presents a drilling site. The mini-driller controller can orient the end effector for drilling on any surface within the reach of the actuators. Configuration of the fixed assembly jig, or any suitable platform, to allow access to the work piece surface assures the ready use of the driller.

FIG. 1 portrays the embodiment of the mini-driller for secondary construction of the wing spars. The most striking feature of the mini-driller when contrasted to Huber, et al., supra, is its small size and its fixation to the assembly jig rather than embedment in the building foundation. Operators easily attach and detach the mini-driller from the jig for movement to a new location. FIG. 1 shows the lower 010 and upper rails 020 of the fixed assembly jig in a greatly shortened state. In use, these rails would extend the length of the spar. Similarly, the transparent work piece skin, shown at 050, illustrates the orientation of the mini-driller to the work piece.

Recall, as indicated in the previous discussion, that a fixed assembly jig is not a necessary element of use of the mini-driller. While the mini-driller does not rely upon a rigid fixed assembly jig for locating the holes it is to drill, the portrayal on the fixed assembly jig does demonstrate many of the location features. Other embodiments have the mini-driller on a lockable dolly or on an air-bearing rather than a fixed jig.

Evident in FIG. 1 are the principal mechanical elements of the invention. On the lower rail of fixed assembly jig 010, a linear rail 011 accurately fixes the mini-driller to the fixed assembly jig at z=0. The skateboard 101, with its guides, rolls along the linear rail 011 maintaining a fixed and known horizontal distance from the work piece 50. An operator engages pins 105 in holes in the rails below 010 and above 020 to fix the lateral position of the mini-driller. The holes are bushed with precision bushings to localize the wear. As such, once the pins or the bushings wear out of prescribed tolerances, the operator replaces the precisely formed pins 105 and bushings to re-zero the tolerances.

Laser routining of the fixed assembly jig by methods such as those taught by Greenwood, et al. in U.S. Pat. No. 5,949,685 issued on Sep. 7, 1999, precisely discloses the location of each hole. All mechanical wear due to placement occurs in the pin (105)-to-bushing relationship. Thus, the selected hole defines the precise location of the mini-driller at any position along the fixed assembly jig. This same feature allows operators to install several mini-drillers along the spar on the fixed jig rail 010 precisely fixed by the linear rail 011. Each mini-driller operates independently, allowing economies by parallel tasking assignment of hole sites within each mini-driller zone.

Beyond the immediate environment of the mini-driller, FIG. 1 portrays the ability of the mini-driller to translate the end effector along the longitudinal (x-axis), and transvers (y-axis) as well as to articulate the end effector 150 in pitch (A-axis) and the yaw (B-axis). The weldment frame 110 provides precise rigidity of the assembly and a principal attachment for the x-axis rail 111 and the x-axis actuator rail 112. A servo-driven screw translates the end effector 150 along the x-axis, along that x-rail 111, engaging the x-actuator rail 112. A second x-axis guide prevents the skewing from the x-axis. Similarly, a second servo-driven gear translates the end effector 150 along the y-axis, along the y-rail 121 engaging the y-actuator rail 122.

The servo-linear actuator 131 controls end effector 150 pitch (articulation in the A-plane). Extension of the servo linear actuator 131 pitches the end effector 150 into a desired attitude. Retraction of the servo linear actuator 131 pitches the end effector 150 into a such necessary attitude. A servomotor 140 pivotally moves the end effector 150, orienting the spindle in the B-plane.

Figure 2:
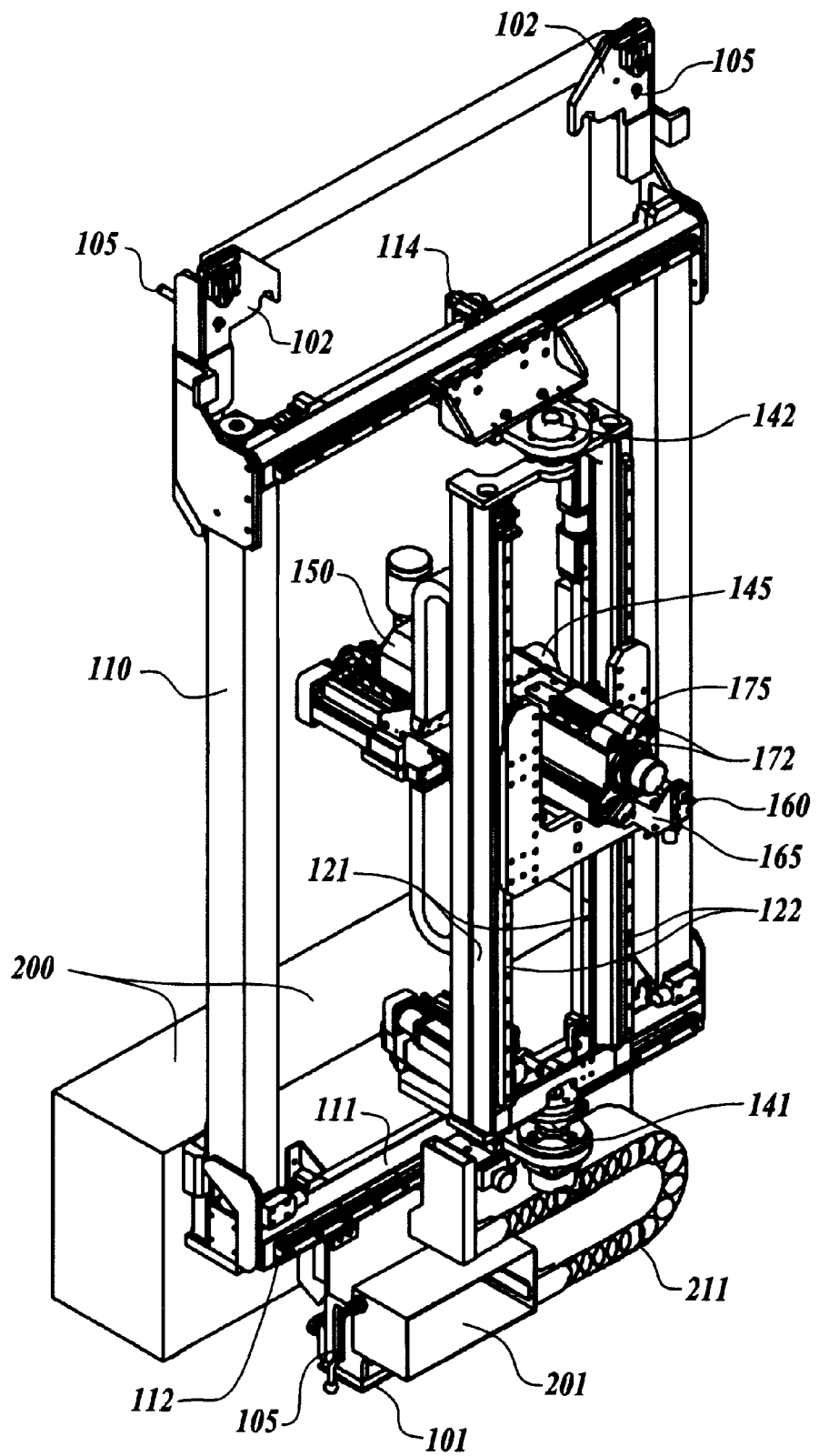
FIG. 2 portrays the mini-driller in isometric view specifically displaying means for displacing the end effector in the longitudinal (x-axis); transverse (y-axis); and feed (z-axis) as well as pitch (A-axis) or yaw (B-axis)

FIG. 2 shows the mini-driller in detail. The parting planes 102 and the skateboard 101 ride along the fixed assembly jig. Locator pins 105 fix the location of the mini-driller along the fixed assembly jig. Once the location on the assembly jig is fixed, all movement of the end effector 150 occurs within the mini-driller weldment frame 110. Translation of the end effector 150 in the x-, and y-axes occurs as indicated in the discussion of FIG. 1. FIG. 2 shows a drill bit 160 in place on the end effector 150. Visible, as well, is the servomotor 145 that controls translation of the end effector in the z-axis. The clamp 165 that similarly extends in the z-axis direction clamps work pieces together for precise location of holes in part-to-part drilling.

FIG. 2 also portrays a camera 175 and proximity indicators 172 on the spindle. The camera might be any of several industrial sensors. In this embodiment, the controller 210 downloads the location, the parameters of a given hole such as location, size, and load. The controller 210 then directs the camera to sense the location of the hole in question. When directed by the controller 210, the camera employs a charge-coupled device ("CCD") that provides the system with the ability to sense the position of locator holes or monuments on parts. On-board processors within the DVT™ camera allow immediate calculation of offsets between fixed points on the work piece surface 050. Optical recognition software allows identification of characteristic features of the surface.

When the camera supplies this information either to the real-time controller 210 or to the operator, the mini-driller has the ability to correct the placement of holes on the work piece 050 in consideration of the position of locator holes or monuments. By use of a mathematical transform, and based upon the expected location of a hole or other monument and the actual location.

There are any of several alternative sensing devices that might be used in conjunction with the DVT camera. There might be a three-legged trivet that senses angle and position by discerning the pressure differential on the each of the three legs. Alternately, the might be an obliquely aimed laser. Any of several visual indicators used in conjunction with the camera enhance its utility on the end effector.

Also present are ultrasonic distance detectors 172. These sensors calculate the distance to the surface of a work piece 050 using the time between emitting a pulsed sound and the receiving its echo from the surface. Not only will the distance detector accurately indicate distance but also it will indicate the position perpendicular to the surface. Even with a curved surface, the work piece 050 should reflect back to sensor an echo of measurable magnitude. By moving to the end effector to optimize the magnitude of the echo, the mini-driller places the end effector perpendicular to the surface.

Finally, FIG. 2 portrays the location of the power supply cabinet 200 and real-time controller cabinet 201. A "cat track" cable carrier 211 to protect cables connects real-time controller cabinet to the actuators. This "cat track" organizes the cables, protecting them from fatigue due to bending, and guiding them away from engaging with such racks as the x-axis rack 112.

Figure 3:
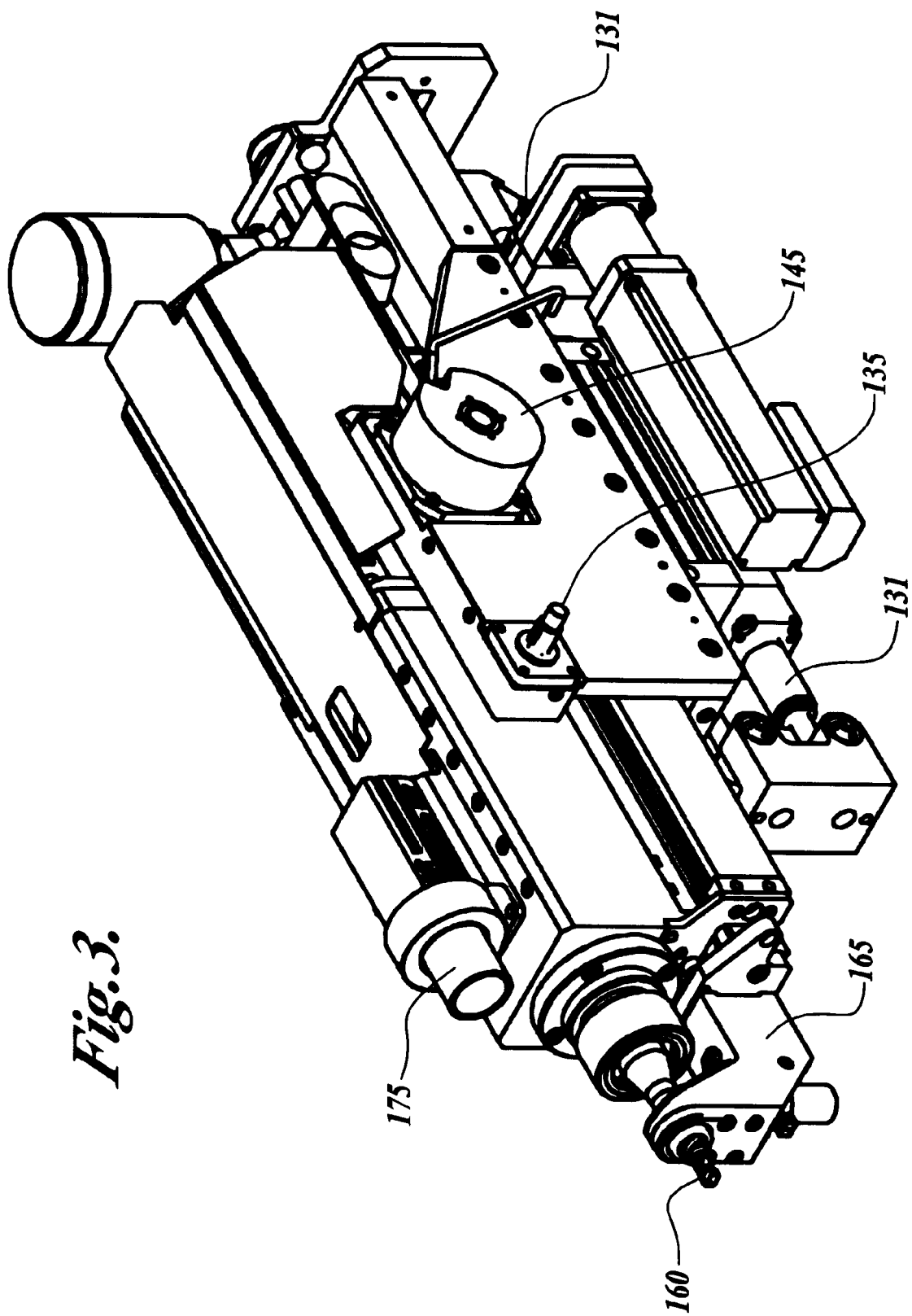
FIG. 3 portrays the spindle in isometric view; specifically portraying detail including the displacement in the z-axis and around the A-axis.

FIG. 3 portrays the end effector 150 outside of the weldment frame 110. Present are the camera 175, the drill bit 160, the parts clamp 165, and the z-axis servomotor 145 for the end effector. Extension of the linear a-axis actuator 131 pivots the end effector 150 about the spindle pivot points 135.

Figure 4:
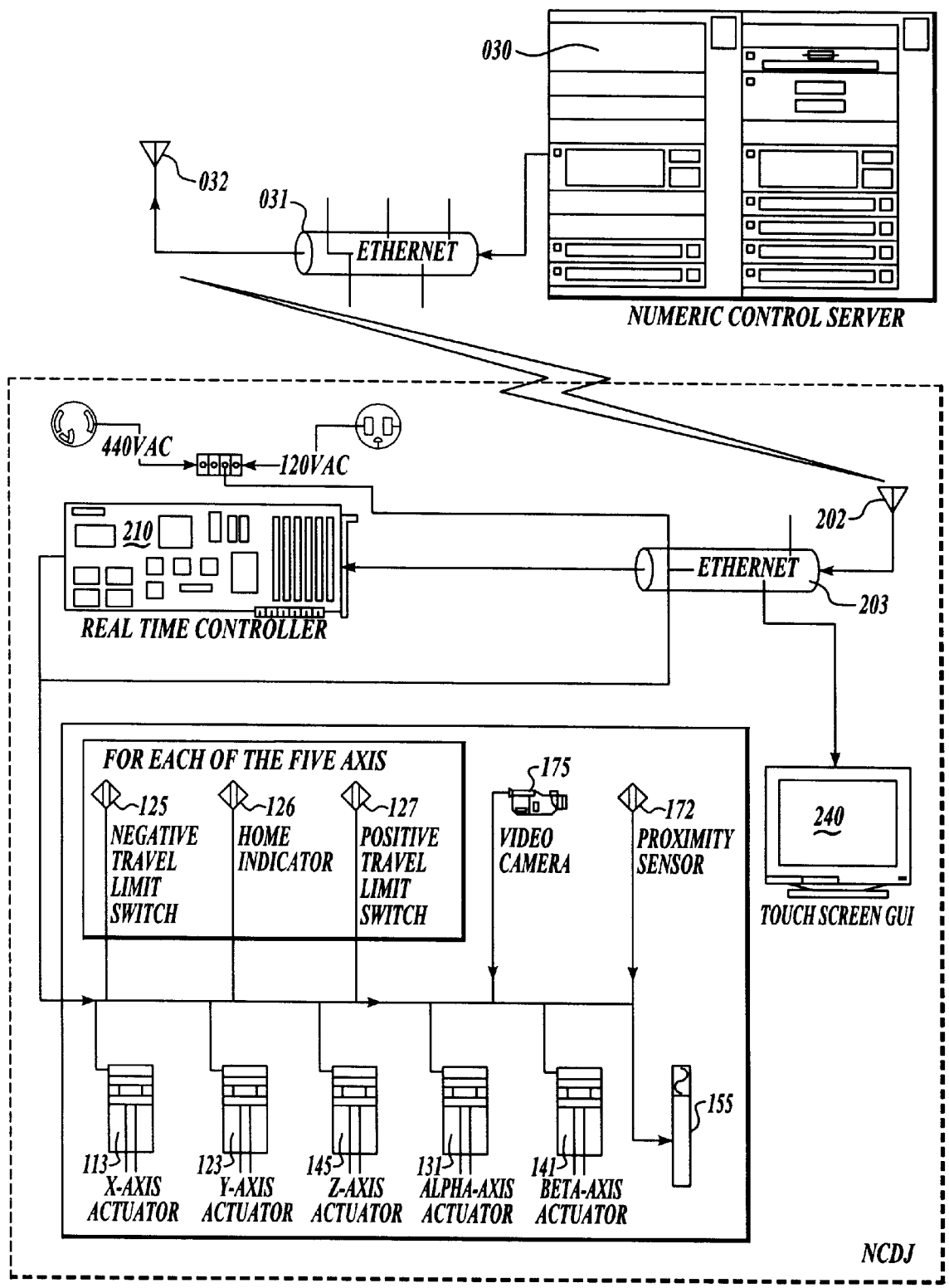
FIG. 4 portrays the principle elements of the mini-driller in communicative connection with the numeric control server.

FIG. 4 portrays the electronic configuration of the mini-driller in relation to the numeric control server 030. The numeric control server communicates with a wireless transceiver 032 though a local Ethernet 031. The transceiver is the port to a local area network without wires. Instead of using twisted pair wire, coaxial cable or fiber optics, wireless LANs use radio frequencies to send and transmit data between the numerical control server and the various network devices without intervening wires or cables. A second wireless transceiver 202 on the mini-driller completes the link across the wireless network. The second transceiver 202 connects through a second Ethernet 203 on the mini-driller. This second Ethernet 203 is the communications bus for the mini-driller.

The real-time controller 210 is the heart of this invention and comprises a stand-alone central processing unit capable of directing all actions of the mini-driller. The controller 210 orients the mini-driller to the work piece 050, downloads hole sites within its scope, executes scripts directing the drilling of holes, and reports the completion of those holes. Actuators, in this embodiment, in each of the five-axes of movement: x-axis 113, y-axis 123, z-axis 145, α-axis 131, and β-axis 141. With the immense computational power that is available in modern day processors, mathematical calculation of the precise location and projection of the tip of the drill bit 160 through each of these five-axes of movement in three-dimensioned space is possible on the mini-driller controller 210.

The controller 210 also controls several auxiliary functions of the mini-driller. For instance, the controller 210 actuates a speed regulator 155 and through it, the rotational speed of the end effector. Similarly, the control can effect other functions such as applying coolant on the drilled surface and actuating the parts clamp 165.

The controller receives information as well. As discussed above, the video camera 175, and the ultrasonic proximity sensor 172 prompt the controller as to the spatial relation between the drilling spindle and the work piece 050. Any variance between expected hole sites and those sensed by the camera 175 and sensor 172 will trigger an alert in the controller. Additionally, the sensors will provide measurement data, not only to the controller, but also through the control to the operator.

The mini-driller can request hole site information from the numeric control server 030. Rather than controlling the mini-drill, the numeric control server 030 acts simply as the repository for all hole site data for all models constructed by a given manufacturer. The controller functions autonomously, thus shifting the computational burden from a central computer to the several mini-drillers that may be working at one time. Once it orients itself to the work piece and then recognizes the model of the work piece, the controller sends a request for the relevant holes within its scope.

Also apparent in FIG. 4 are the axis indicators for each of the five axes set forth in this embodiment (x-, y-, z-, A-, and B-axes). For each axis, the operator or mechanic routines the tool in order to assure that each mini-driller will perform in an identical and precisely predictable fashion. Three switches reside on each axis of the mini-driller. These switches fall into two separate categories; two travel limit switches, a positive 125 and a negative 127 switch (non-contact type), and a home reference switch 126 (mechanically actuated). The purpose and functionality of the travel limit switches 125 and 127 is quite simple and straightforward. Travel limit switches protect each axis drive train from damage due to collision with hard stops at either end of travel. These travel limit switches actuate just inside the hard stop limits. In this way, a limit switch trips before collision, halting any axis translation that would drive the machine into hard stops.

The second category of switch 126 is the home reference switch. This switch is located along the translation envelop of each axis between the positive and negative travel limit switches. This switch 126 is roughly located within the translation envelope as defined by the travel limit switches 125 and 127. The exact location of the home reference switch 126 within this translation envelope is not required by its function, but rather would likely be placed close to either of the travel limit switches 125 and 127 in order to minimize wear.

The important parameter for this home reference switch 126 is its stability. This switch, as the name implies, provides a known repeatable "home" point from which the machine can derive its position along each axis of movement. Because commanded movement along the axis in question occurs at a precisely known rate due to the selected servo actuator configuration, one origin point and a known rate.

The controller 210 achieves calibration of the mini-driller by issuing an instruction for the commanded axis to seek the home switch 126. Once the controller precisely locates the home reference switch 126, the controller 210 then sets the zero point along the commanded axis. The controller 210 sets this zero point for each axis and then defines this zero point as the axis origin in "raw" or "machine coordinates."

To complete the calibration, a trained mechanic mounts the mini-driller on a test fixture. The test fixture is machine to precise tolerance and includes a calibration zero for each axis. These calibration zeros define the universal zero for all mini-drillers. Thus, after the controller 210 moves from the arbitrary home switch on each axis to this universal zero, the controller 210 has calibrated the machine on this axis. Once each axis is calibrated, the differences between these home switch positions and the universal zero on the axis, the controller 210 stores these offsets on the mini-driller's non-volatile memory along with a sign indicative of orientation. The controller will by use of these coordinates, perform a mathematical transform on each set of hole sites sent to the mini-driller controller 210 correcting each set of hole sites with the offsets stored on the non-volatile memory. Thus, when fixed to a coupon test bench, each mini-driller, when given the same hole coordinates should drill precisely identical test coupons regardless of the values of these offsets.

Such is not the only way by which the operator can calibrate the mini-driller and controller. There are absolute locating means that use a feedback loop to precisely map and calibrate the movement of the mini-driller spindle. A virtual test fixture might use a camera much like the locating camera to calibrate movement in response to controller commands. Laser tracking is also a very efficient and accurate way to calibrate the mini-driller.

Upon placing the spar onto the fixed assembly jig, a skilled mechanic calculates the precise position of the spar in relation to the fixed assembly jig. The mechanic discerns the precise offsets, using such known methods that best place the spar, and causes the same to be stored on the numeric control server 030 in association with the current state of the jig. The resulting additional offset values relating the jig to the spars allow the mini-driller, once the controller downloads these additional offset values, to precisely transform the hole sites in spar coordinates to instructions to the actuators operating the end effector 150 resulting in precisely and repeatably located holes.

Figure 5A:
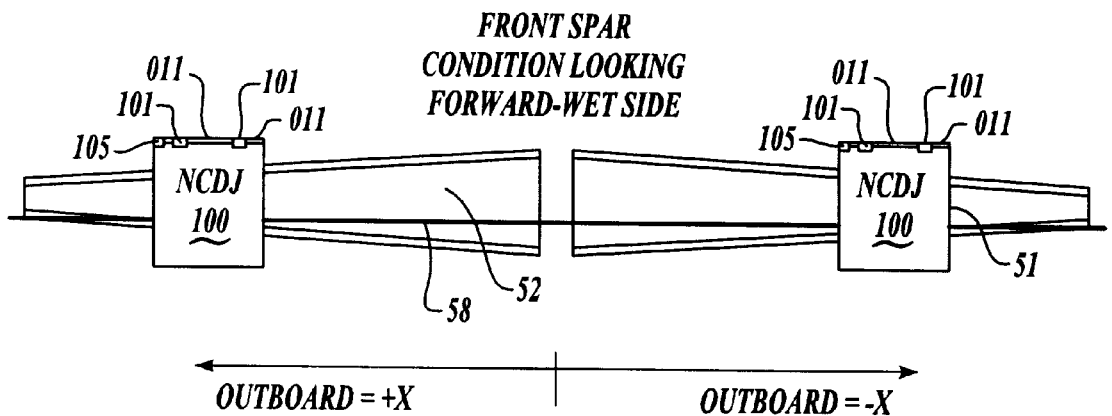
FIGS. 5a and 5b portray examples of the operation of the mini-driller in the context of wing construction and indicates the system of displacement relative to the work piece rather than to the mini-driller or to the assembly jig.
Figure 5B:
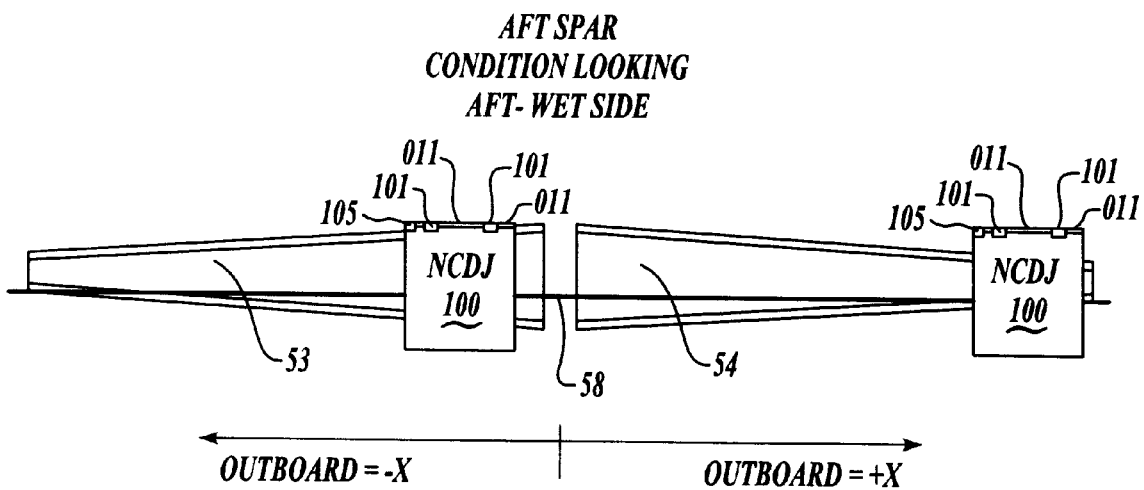

FIG. 5 portrays the mini-driller 100 in several positions on the fixed assembly jig 58 situated between the front 51, 52 and rear spars 53, 54 (starboard and port respectively) and running the length of both wings. As discussed above, the pin 105 fixes the mini-driller along the length of the spar into one of the predefined zones. Notable in this FIG. 5 is coordinate system. Zero, lies precisely at the midpoint between the spars. Movement toward port is in the positive direction, toward starboard is negative. The controller 210 maintains this absolute orientation, in spite of the orientation of the mini-driller. The controller 210 achieves this by simply knowing its place on the jig. Like the positioning of the spars, the numeric control server 030 stores the position and orientation of the work piece in relation to the defined zones on the fixed assembly jig. When the real-time controller requests the download of data associated with the mini-driller position on the fixed assembly jig, that data comprises information about orientation and relation of the work piece to the zone.

Figure 6:
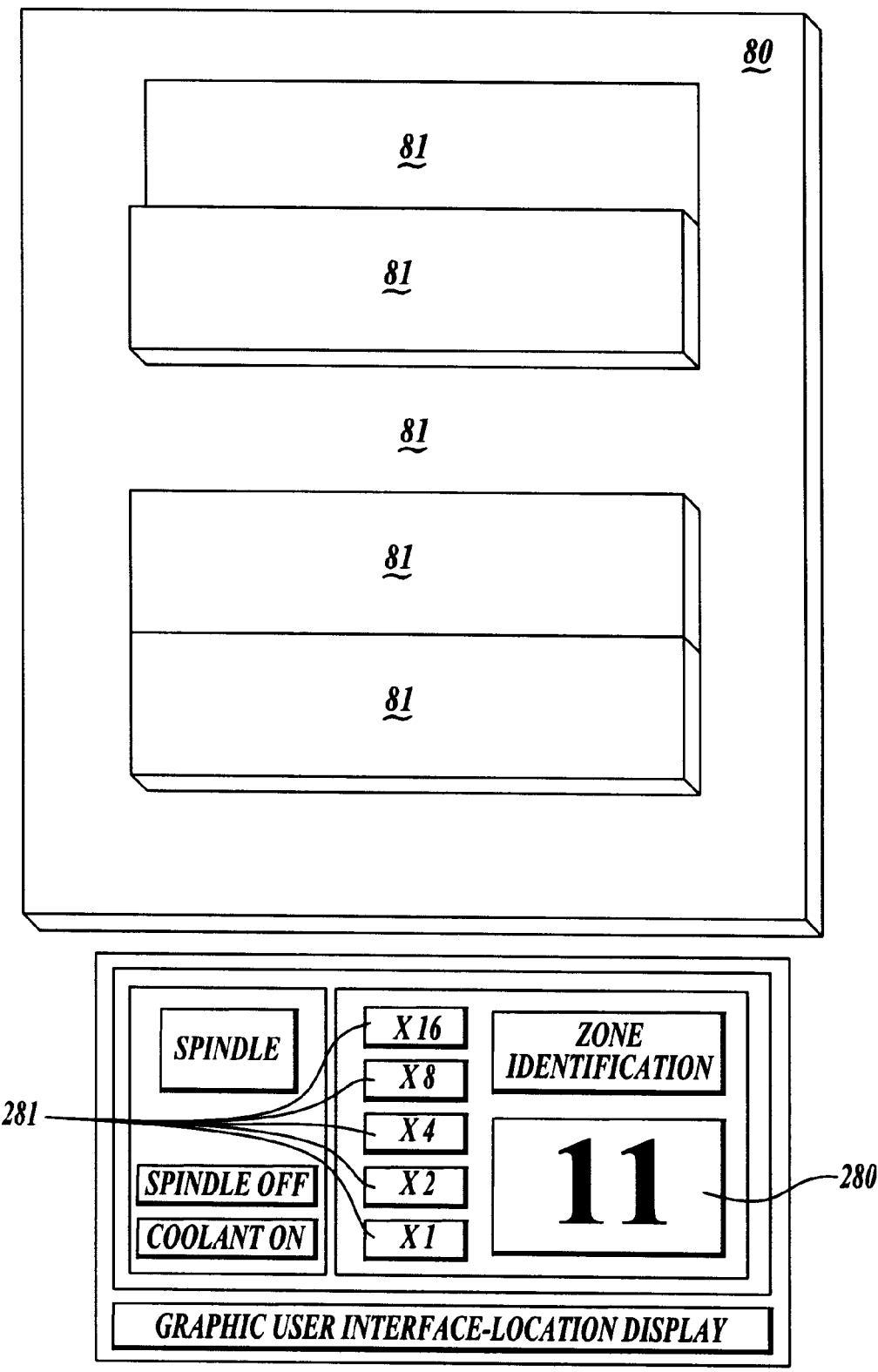
FIG. 6 portrays reference features attached to the fixed assembly jig and display of mini-driller representation of that reference feature on the graphic user interface.

To aid the mini-driller in locating itself on the fixed assembly jig, the jig carries a number of reference features with zone information such as that portrayed in FIG. 6. While any bar code or Braille type code might work, these solid flag reference features have proven simple, reliable, and inexpensive. The controller reports out the zone it occupies on the fixed assembly jig by portraying the reference feature on the graphic user interface 240 and translating the binary code to a displayed decimal zone number 280.

Figure 7:
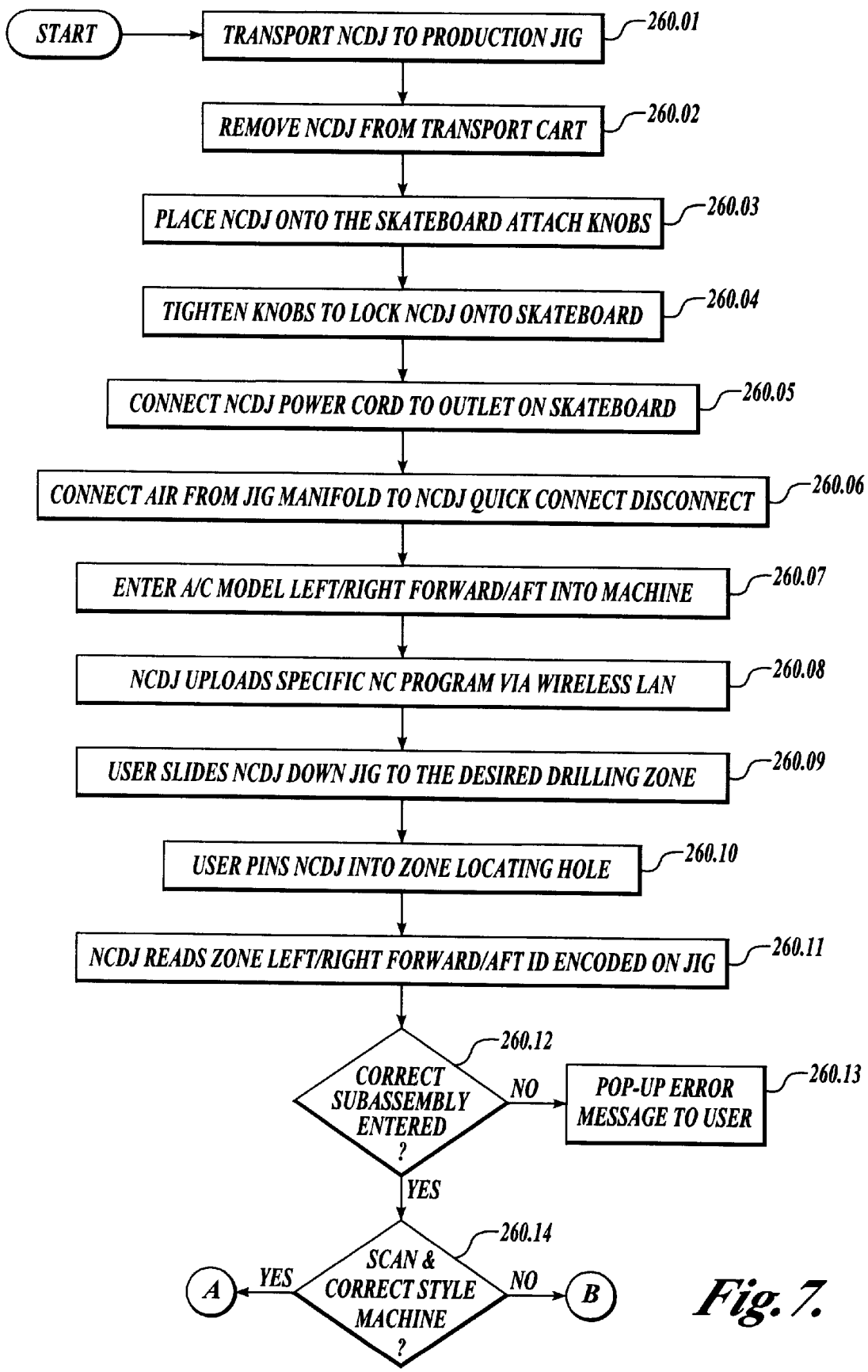
FIG. 7 is the first section of a flow chart of the procedure necessary to initialize the mini-driller for use in place.

FIG. 7's flowchart displays the first protocol in placing and operating the mini-driller. Transporting the mini-driller to the jig 260.01 and removing the mini-driller from its transportation dolly 260.02 are necessary first steps. Mechanics place the mini-driller on the fixed assembly jig 260.03 by setting the skateboard onto the linear rail. Tightening and loosening knobs sets and pulls the pins 105 into and out of the bushed holes, fixing the mini-driller into one of the predefined drilling zones on the fixed assembly jig 260.04. The mechanic also connects auxiliary power 260.05 and compressed air 260.06 to power the mini-driller.

Once powered, the mini-driller the mechanic enters the model information 260.07, thus beginning the orienting process. From the position on the jig, the mini-driller real-time controller requests the hole sites for the work piece on the jig as well as the offset information and, in response, the numeric control server then sends the hole sites for the model to the mini-driller 260.08. The mechanic then slides the mini-driller along the jig to a precise position 260.09 then tightens the knobs setting the pins 260.10. Once pinned, the mini-driller either perceives its position on the fixed assembly jig or displays a request on the graphic user interface 240 to the mechanic to enter the same 260.11. If both occur and the results do not agree 260.13, a message appears on the graphic user interface 240 and the mini-driller stops the operation. If the results do agree, the camera 175 on the end effector 150 then scans the work piece surface for expected reference features or monuments in order to assure the identity of the work piece in terms of model and variant 260.14.

Figure 8:
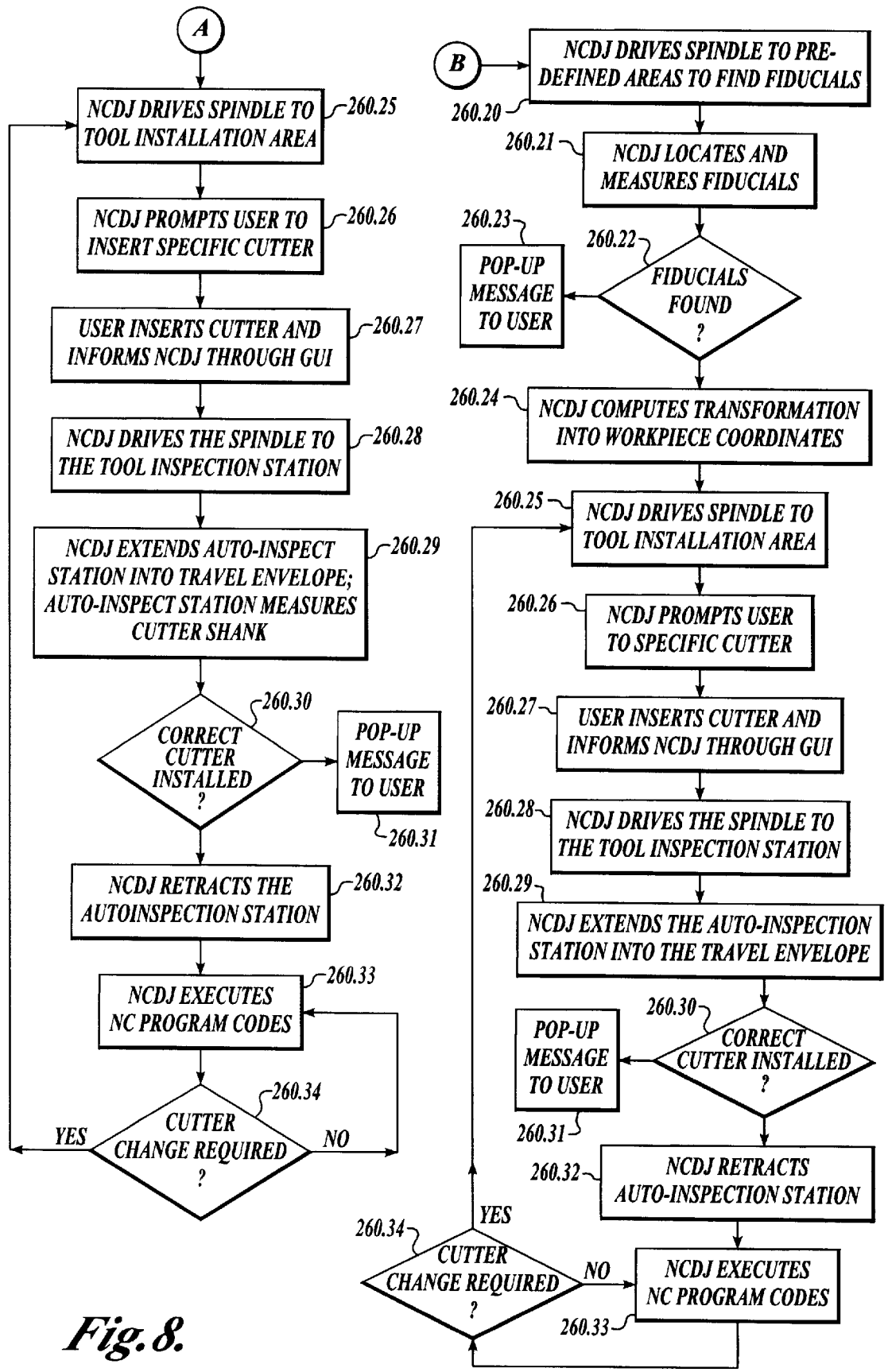
FIG. 8 is the second section of a flow chart of the procedure necessary to initialize the mini-driller for use in place.

FIG. 8 portrays the second portion of the protocol. Where the camera determines a match for the designated and perceived model and variant, the controller then manipulates the end effector 150 to the expected location for confirming reference features 260.20 on the surface of the work piece and then, again, activates the camera 175 to check for the location of the reference features 260.21. If the camera does not find the reference features 260.22, a message is displayed to the operator 260.23. Once the camera locates the reference features, it measures offsets between expected positions and found positions of the reference features and creates the appropriate mathematical transform 260.24.

Once the appropriate transform exists to correct the position of the hole sites in light of reference features, the protocols become the same as that for the instance where the reference features are precisely where anticipated.

The controller 210 drives the end effector 150 to the installation area 260.25. The controller then displays a message on the graphic user interface 240 requesting the operator to insert a specific hole cutter 260.26. The operator inserts the hole cutter and locks the same home 260.27. In other embodiments, the controller 210 automates the cutter selection and loading. In either procedure, the controller 210 drives the spindle to the tool inspection station for verification by optical inspection 260.28. Simultaneously, the controller drives the tool inspection station out from its normal storage position into the travel envelope of the end effector 150 for inspection and inspects the drill bit for size 260.29. If the inspection station detects an incorrect bit 260.30, the controller stops the mini-driller and sends a message for display on the graphic user interface 260.31. If the measured size does correspond with the anticipated size, the controller retracts the auto inspection station. Having verified model, location, and size of hole and hole cutter, the controller 210 executes the drilling program drilling all holes within the zone appropriate to the sized cutter 260.33 and then proceeds to another hole cutter and the appropriate holes 260.34.

Figure 9:
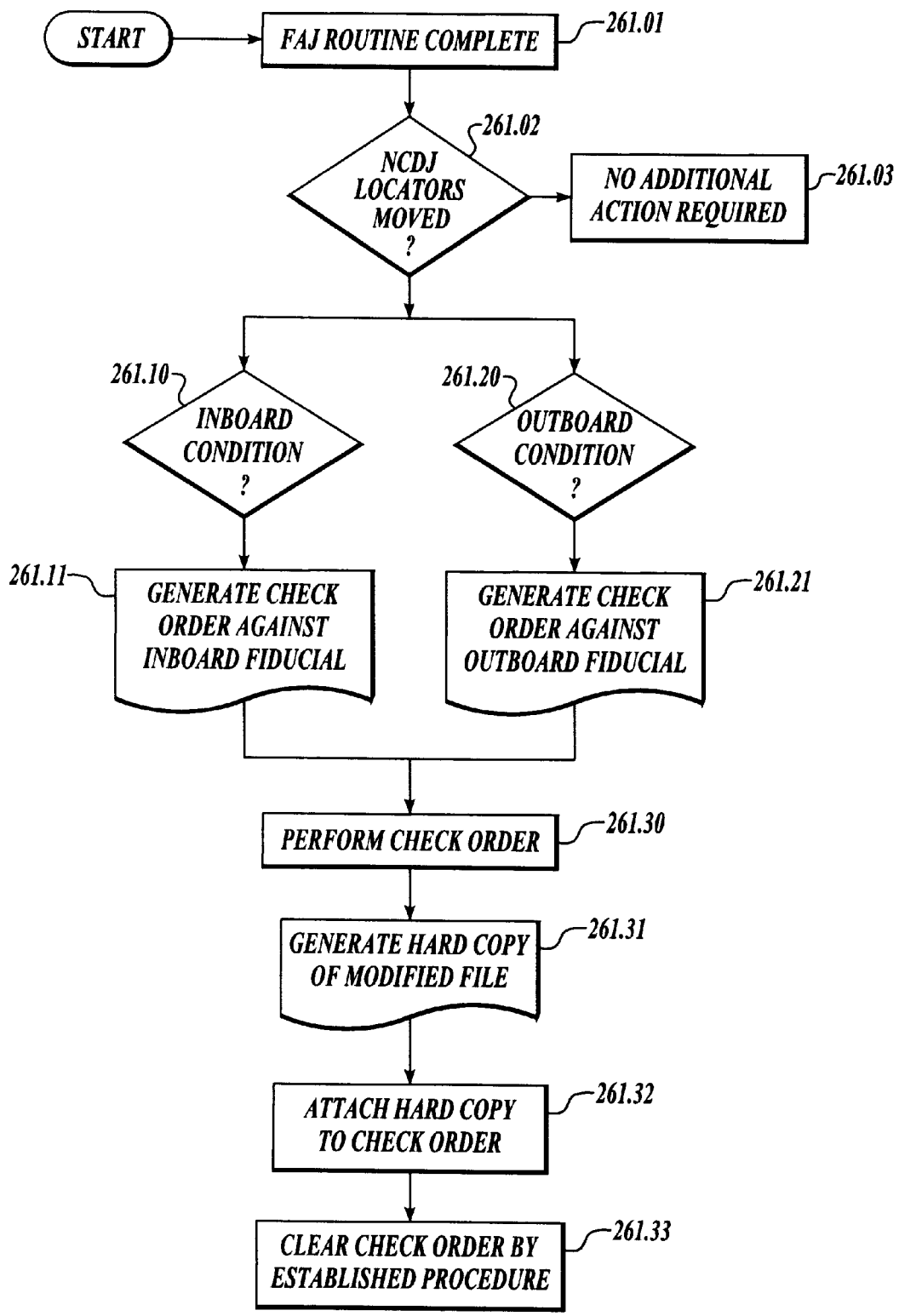
FIG. 9 is a flow chart of the procedure the mini-driller executes to determine its placement on the fixed assembly jig.

FIG. 9 displays a flow chart of the method of compensating for thermal distortion of the fixed assembly jig. As discussed above, the fixed assembly jig comprises a number of holes along the linear rail that define the zones for the mini-driller. The Laser routining of the fixed assembly jig by methods such as those taught by Greenwood, et al. in U.S. Pat. No. 5,949,685 issued on Sep. 7, 1999, precisely discloses the location of each such hole 261.01. Once the routining precisely locates the holes, the controller compares found locations of the holes to last known location stored on the numeric control server 261.02. In the event that the locations are the same as the stored locations, no further changes are necessary 261.03.

In the event that the hole locations do differ, they are either inboard or outboard of the last known location. Inboard locations indicate that the holes are closer to the midpoint between the wings as shown in the referential coordinates in FIG. 5. Inboard conditions indicate thermal contraction of the fixed assembly jig. Outboard conditions or displacement away from the midpoint indicates the thermal expansion of the fixed assembly jig. Inboard conditions 261.10 require an inboard check 261.11; Outboard conditions 261.20, and outboard check 260.21. The controller 210 performs transform and checks for the anticipated location of the reference features 261.30. In the event that the reference features are not where anticipated, the controller prints a hard copy of the transformed hole locations 261.31 and attaches the same to the check order 261.32. The controller 210 then forwards the same to a mechanic for examination and resolution of the deviation in the anticipated location of the reference features.

Figure 10:
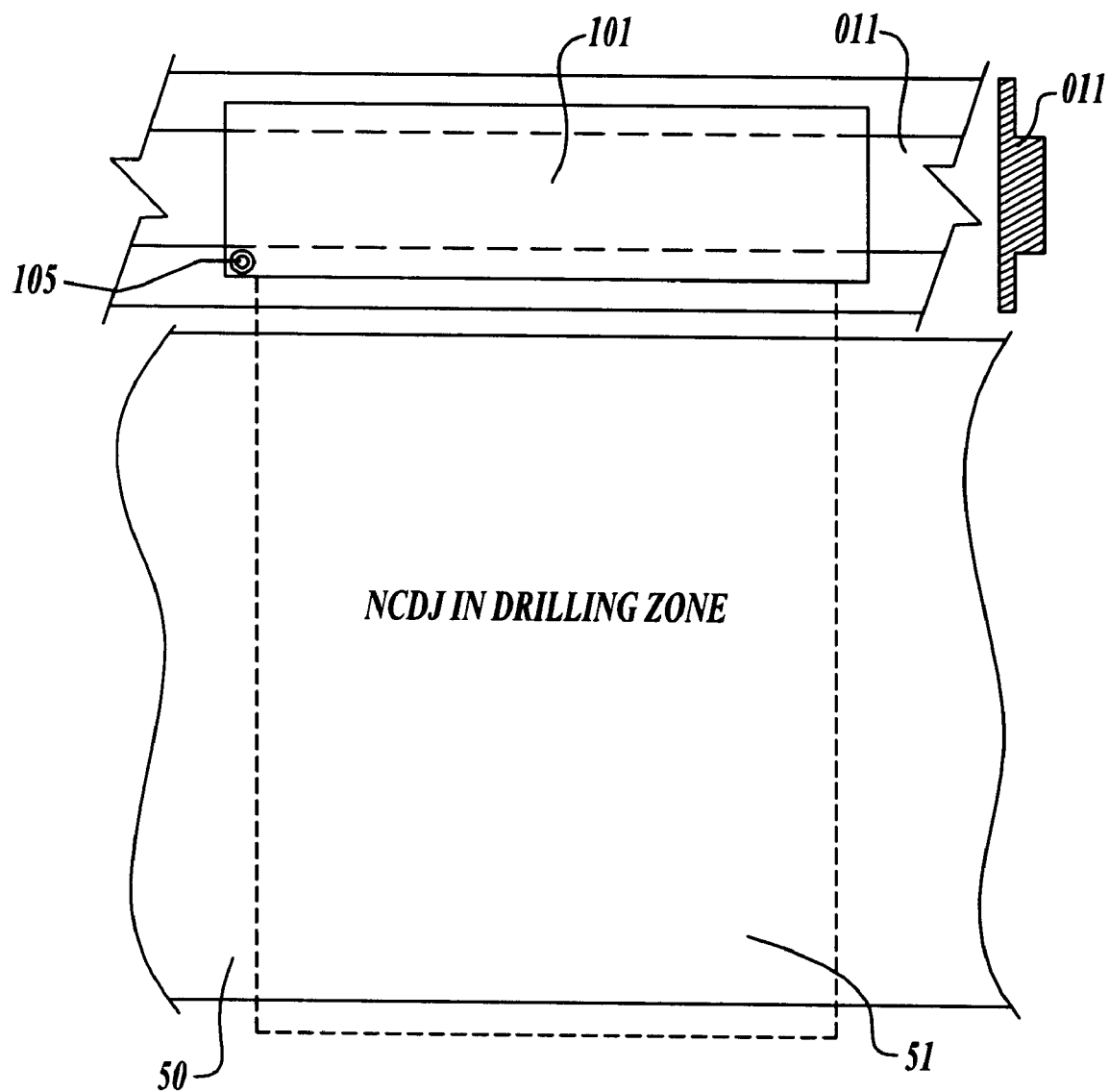
FIG. 10 portrays the mini-driller in any of several positions along the skateboard guide rail on fixed assembly jig and the corresponding drilling zone accessed because of placement.

As discussed above, each bushed hole in the fixed assembly jig defines a drilling zone 51 on the work piece 50. FIG. 10 shows how the zone 51 is defined. As the skateboard 101 slides along the rail 011 bearing the mini-driller, the skateboard 101 and mini-driller 100 pass through defined zones. In each position, there exists a three-dimensioned envelope defined by the ability of the end effector, as designed, to drill suitable holes. The intersection of this envelope with the work piece 50 defines a potential zone. The location of each of the bushed holes on the fixed assembly jig is known by the routining taught in Greenwood, supra, and thus, pinning the mini-driller in any of these known holes defines a zone.

It bears repeating that the neither the fixed assembly jig nor the bushed hole are necessary for locating the holes. Bar codes, fiducials, and, indeed, the unique constellation of holes in a particular zone allow the controller to locate the mini-driller in relation to the workpiece. The operator, by means of the pendant.

Figure 11:
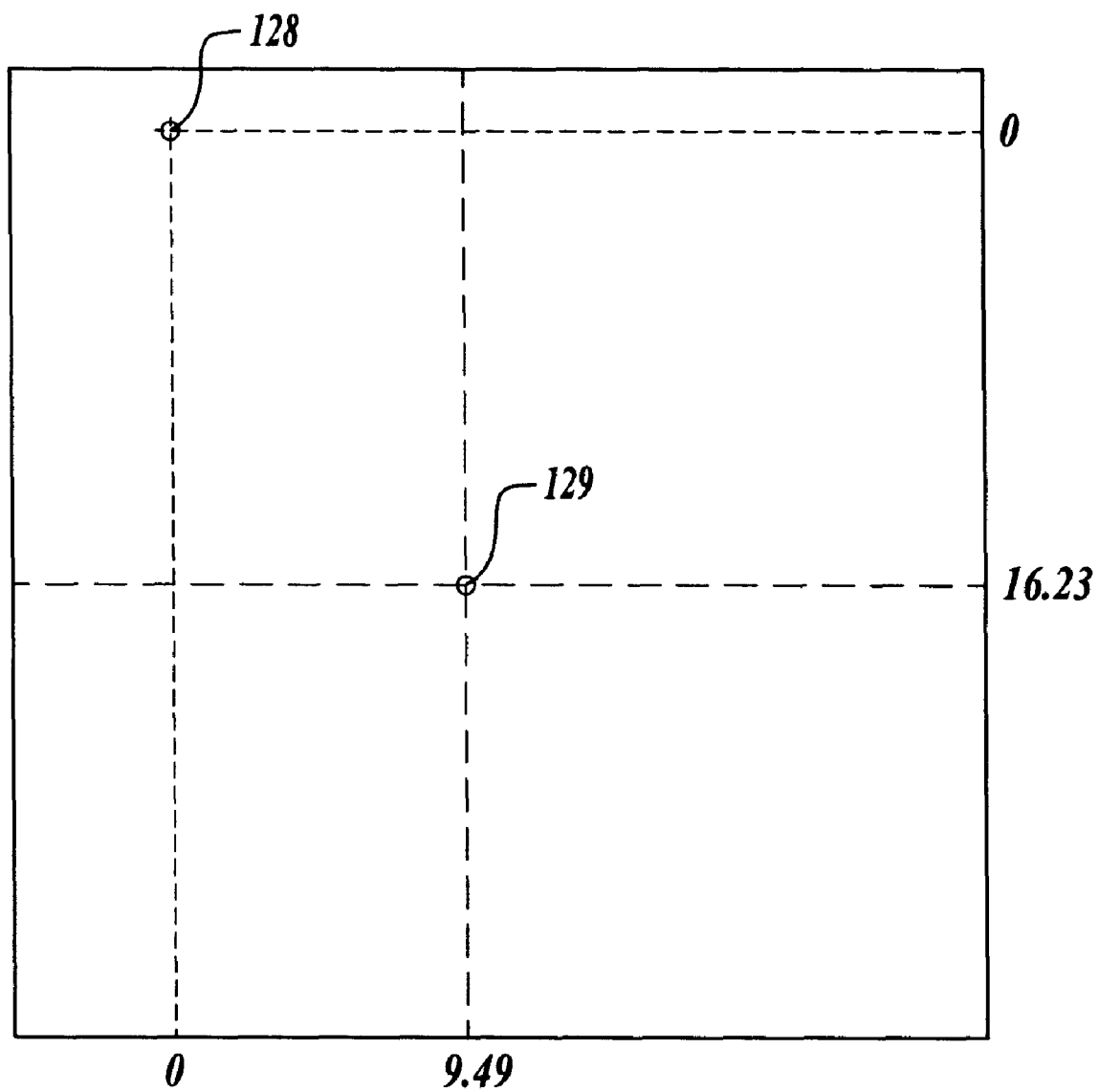
FIG. 11 portrays the coupon calibration of the mini-driller for correction, in this case in the x- and y-axes.

FIG. 11 portrays the calibration process discussed limited, for clarity, to two axes, the x-axis and the y-axis. Here along the x-axis, construction of the mini-driller placed the home switch at coordinate −9.49; along the y-axis at −16.23. The controller assigns the coordinates a value of (0,0) where they intersect at 128. A skilled mechanic then manipulates the end effector over a fixture and places the point of the end effector at the universal zero point on the fixture 129. At this point, the mechanic confirms to the controller that the point is at the universal zero point 129, and the controller notes the displacement along each of the axes. Thus, the controller will store coordinates on its non-volatile memory as (9.49, 16.23).

Figure 12:
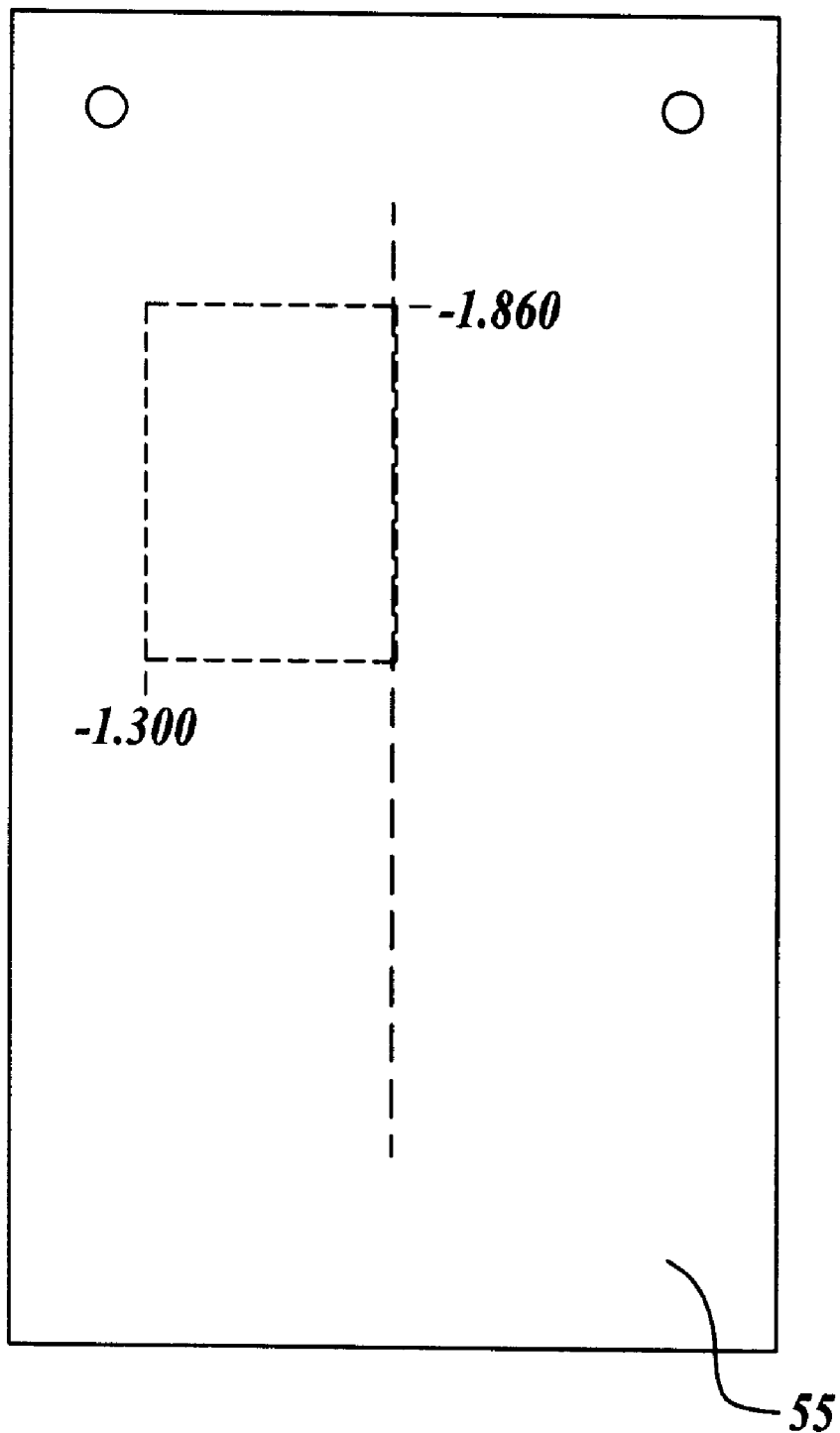
FIG. 12 portrays the application of the calibration factors stored in correction of hole sites resulting in a precisely drilled test coupon.

In order to test the mini-driller calibration, the mechanic fixes the mini-driller to a coupon test stand. The coupon test stand is a fixture that allows the mini-driller to drill on expendable standardized coupons of sheet aluminum. FIG. 12 shows the fixture holding the coupon 55 in a fixed and repeatable position. The fixture also holds the mini-driller in precise and standardized placement. The controller then requests the download of hole sites and a simulated numeric control server sends a standardized constellation of test points to the mini-driller, in this case, a single point with coordinates (−1.300, −1.860). The mini-driller drills the coupon. If properly calibrated, the coupon should precisely duplicate other such coupons, regardless of which mini-driller drilled the coupon.

While the calibration process is as set forth here, the mini-driller is also tested for "squareness" on the coupon test fixture. As shown in FIG. 13, a coupon might indicate that the mini-driller is out of square, or skewed to the orthogonal. The coupon 56 indicates any skewing because of the known constellation of test holes. The skilled mechanic loads any skewing measurements into the controller and creates a second mathematical transform to account for skewing. The second coupon 57, with this correction, again, should be uniform.

Figure 14:
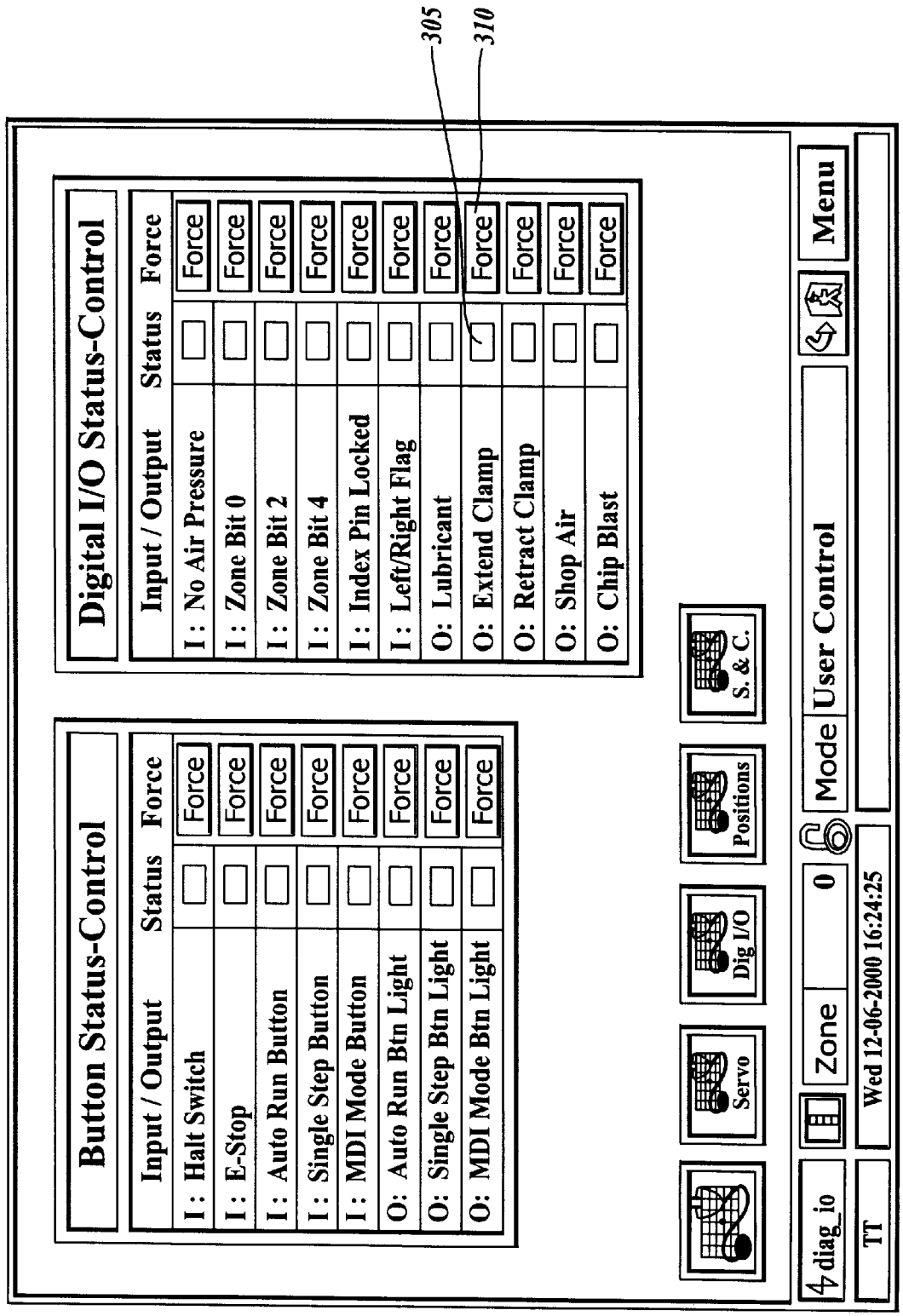
FIG. 14 portrays the status screen of the mini-driller as displayed on the graphic user interface.

The heart of the interaction between the operator and the mini-driller is a touch sensitive flat display screen on a slate-like enclosure known as a pendant. FIG. 14 shows a status screen on the pendant for all of the essential functions of the mini-driller. The real time controller portrays each function with an override button labeled "Force." For instance, the function "extend clamp" is shown with its status light 305 and an override button 310. In operation, the operator can quickly assess the status of the mini-driller and change that status by simply tapping the screen on the appropriate "force" button.

In addition, as described above, the operator uses the pendant in the calibration and subsequent use of the mini-driller. On the screen shown in FIG. 15, the graphic user interface ("GUI") displays the positioning of the end effector in the x- and y-axes. The GUI displays the angle of the end effector in the spherical bearing 316 in the α-axis (α is denoted here as A) and the β-axis (β is denoted here as B).

As the operator scrolls through a number of hole sites downloaded to the mini-driller as described above, the controller displays the x- and y-coordinates of each 317. For each hole, the controller displays correction information 318. As well, the GUI displays displacement in the z-axis 319, i.e. extension of the drill bit into the work piece.

The GUI also presents the data garnered by the Disruptive Virtual Technology™ camera sensor. FIG. 16 sets forth the GUI in the course of a "scan and correct" process. As described above, the principal use of the camera is to determine whether the known surface features of the work piece comply with those found on the actual work piece. In FIG. 16, the scan indicates no x-axis error 321 and no y-axis error 322.

Figure 17:
FIG. 17 portrays the mini-driller in the course of parsing MCD script files directing the location of holes.

Because the GUI has proven to be a highly communicative input and output interface, the design of the controller seeks to exploit all of its capability on behalf of the human operator. As indicated above, the controller downloads hole sites in a drilling script known as MCD. This script is highly optimized, in its raw form, to contain only the numeric information necessary to fix a hole site and its dimensions in space. Optimization cuts transfer time by eliminating the transfer of unnecessary or redundant information. Such an optimized language is highly numeric and difficult for a human operator to interpret. The controller, on the other hand, parses MCD into orders for each of the actuators on each of the axes. FIG. 17 shows the controller in the course of parsing MCD into motion orders for the mini-driller. FIG. 18 shows the results of that parsing into a series of defined actions of the various actuators allowing the mini-driller to execute the MCD. The controller defines each action on the screen as a composite of actuator movements.

Figure 19:
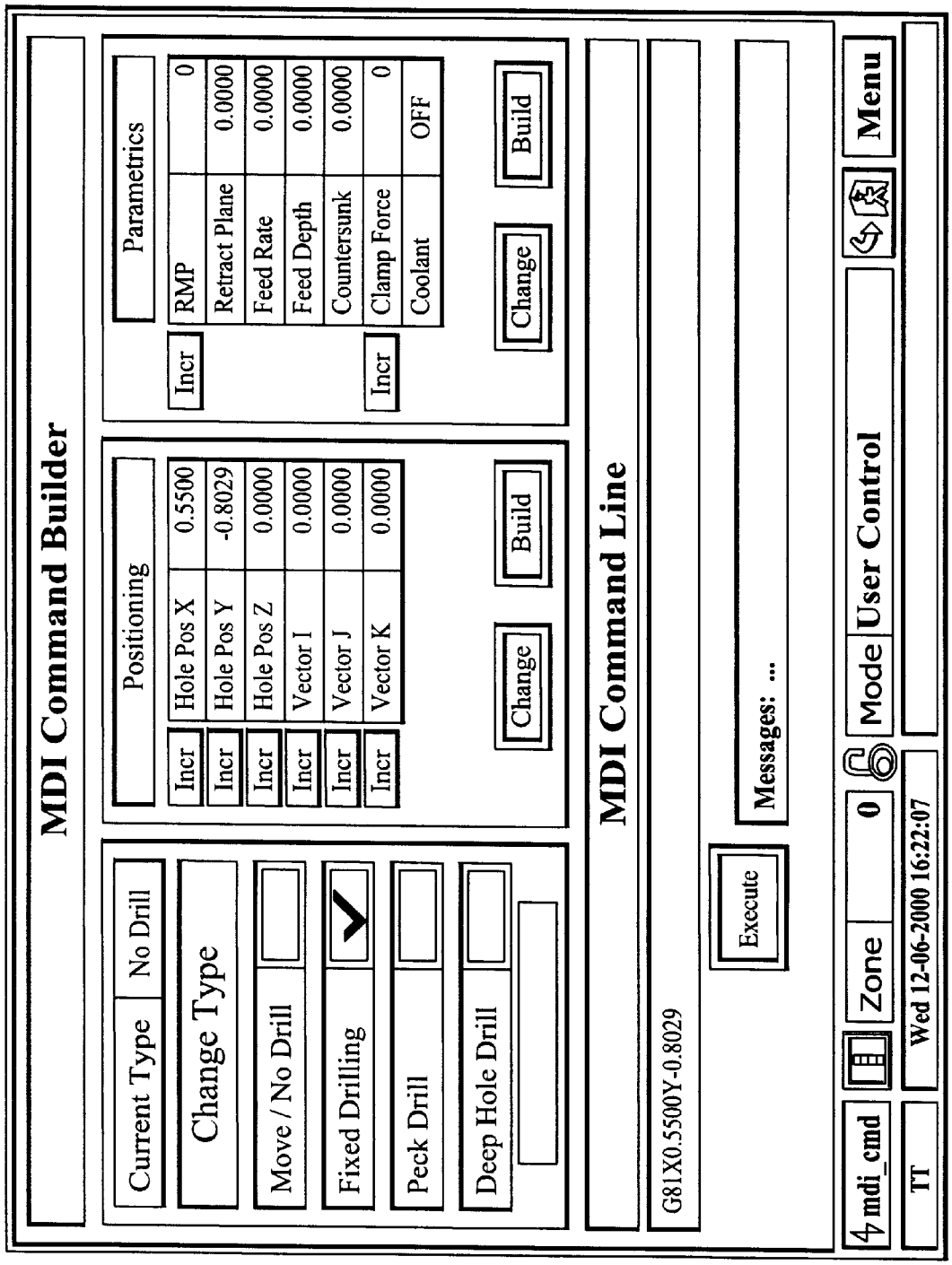
FIG. 19 portrays the screen that enables the use of the graphic user interface for compiling commands in the MCD script.
Figure 20:
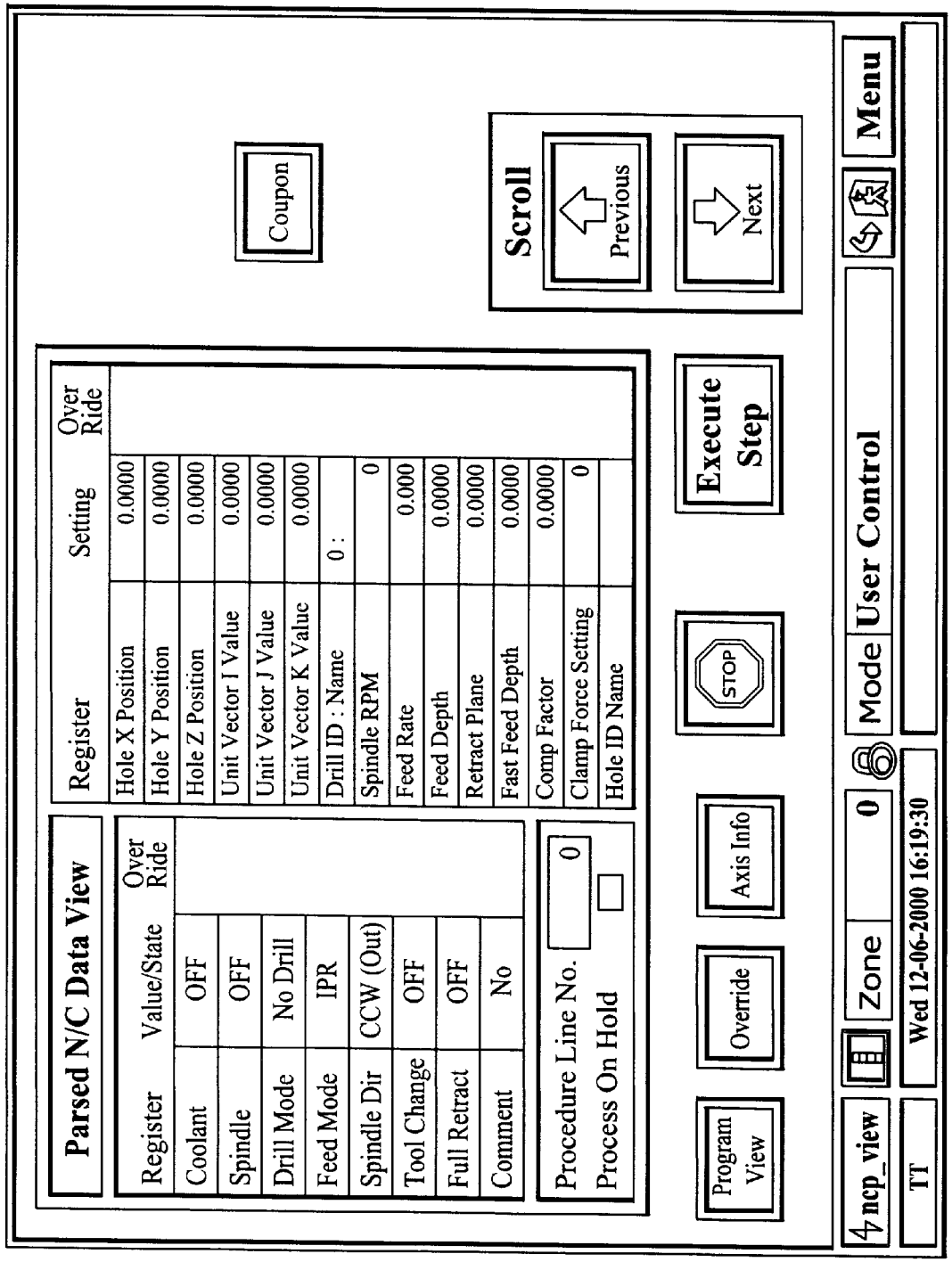
FIG. 20 portrays the display of the MCD script as parsed in the course of a line-by-line review of MCD script.
Figure 21:
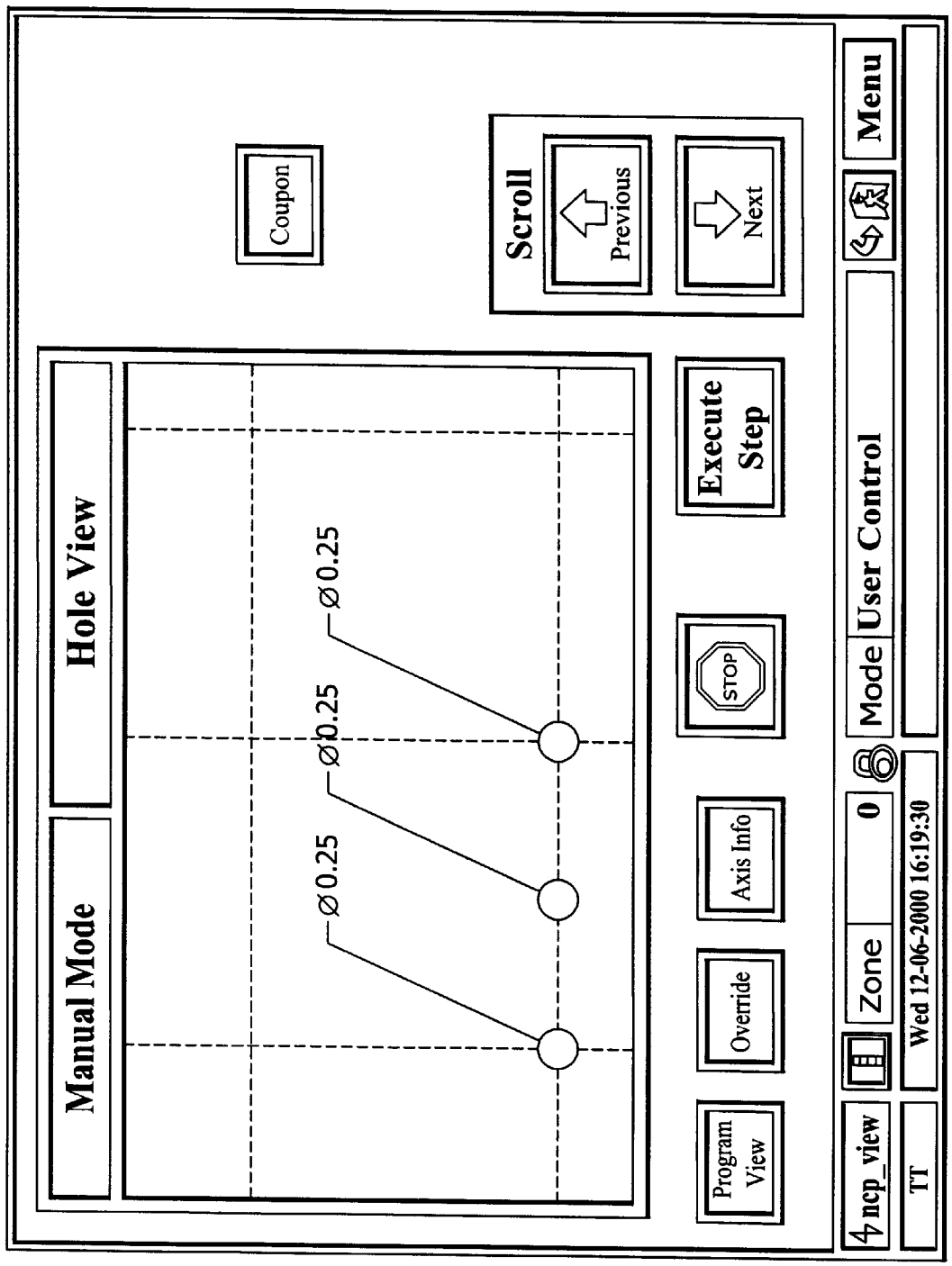
FIG. 21 portrays hole locations as dictated in MCD script and portrayed graphically.

The controller works in both directions, not only to de-compile MCD, but also to build MCD commands. The operator seeking to construct the MCD command to drill a specific hole can manually enter the dimensions and position of the hole into the screen at FIG. 19. The controller will then compile the entered data as MCD script. As the script grows, the operator can use the screen at FIG. 20 to review results. Finally, the screen at FIG. 21 allows the operator to review any MCD script as a graphic portraying the holes in the zone pictorially.

Figure 22:
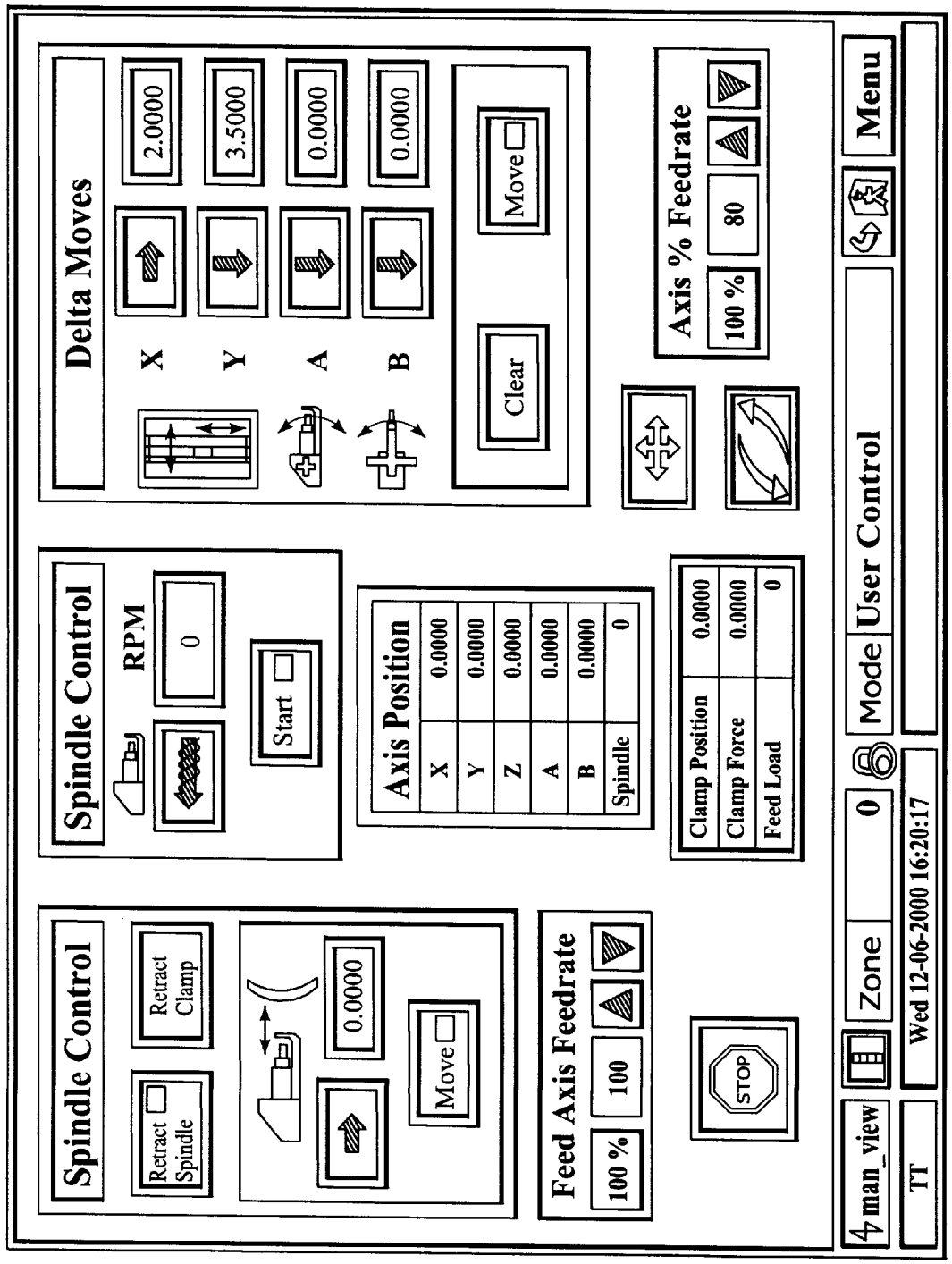
FIG. 22 portrays the display by the graphic user interface allowing the operator to override the MCD script commands.
Figure 23:
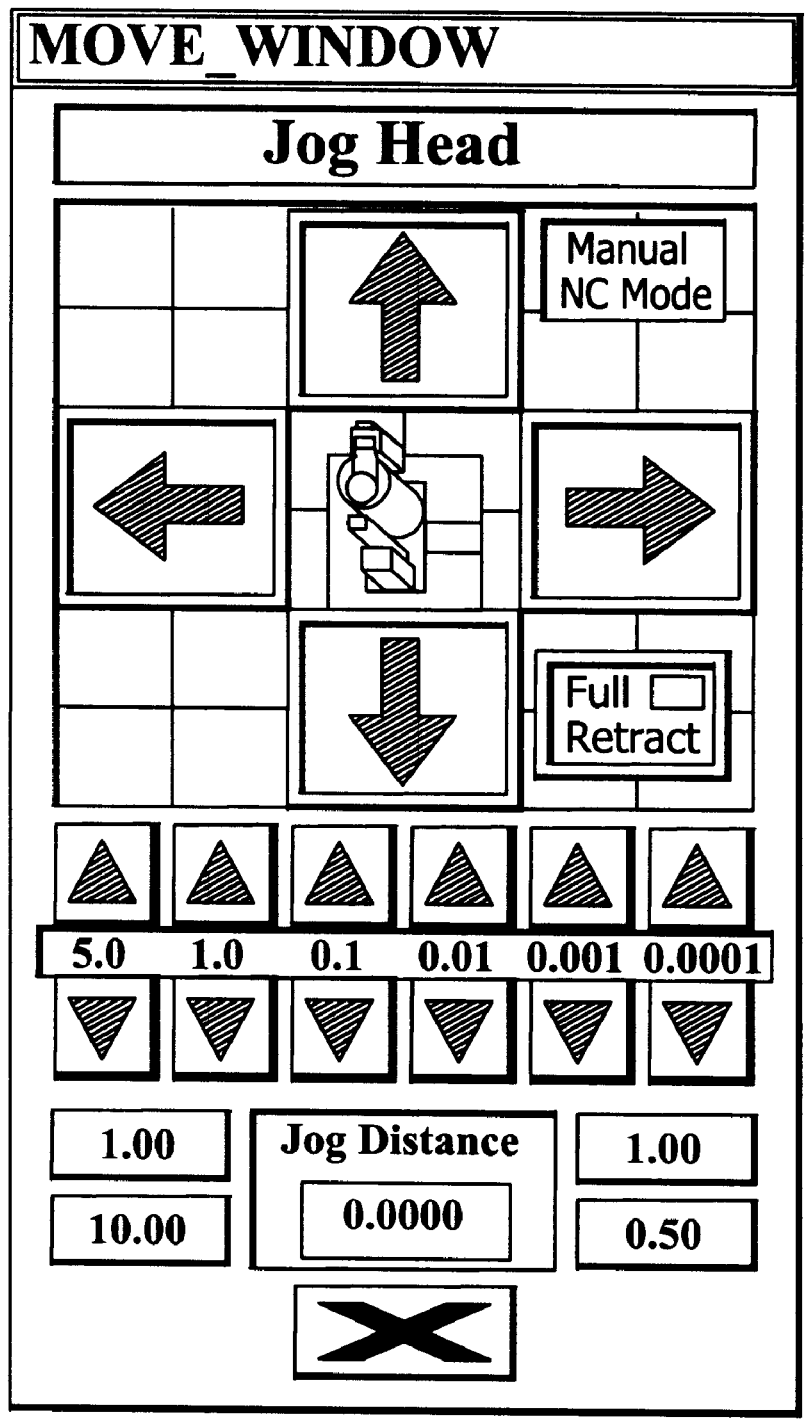
FIG. 23 portrays the display by the graphic user interface in the "joystick" mode necessary to jog the end effector in the several axes.

The mini-driller can also function in a fully manual mode. FIG. 22 portrays the mini-driller in manual mode. The screen reads out each of the essential functions of the mini-driller and then allows for incremental adjustment of each. FIG. 23 shows the control screen in "joystick" mode allowing control of translation in selected axes. Finally, the controller allows the modification of any one command in MCD script as portrayed in FIG. 24.

Figure 25:
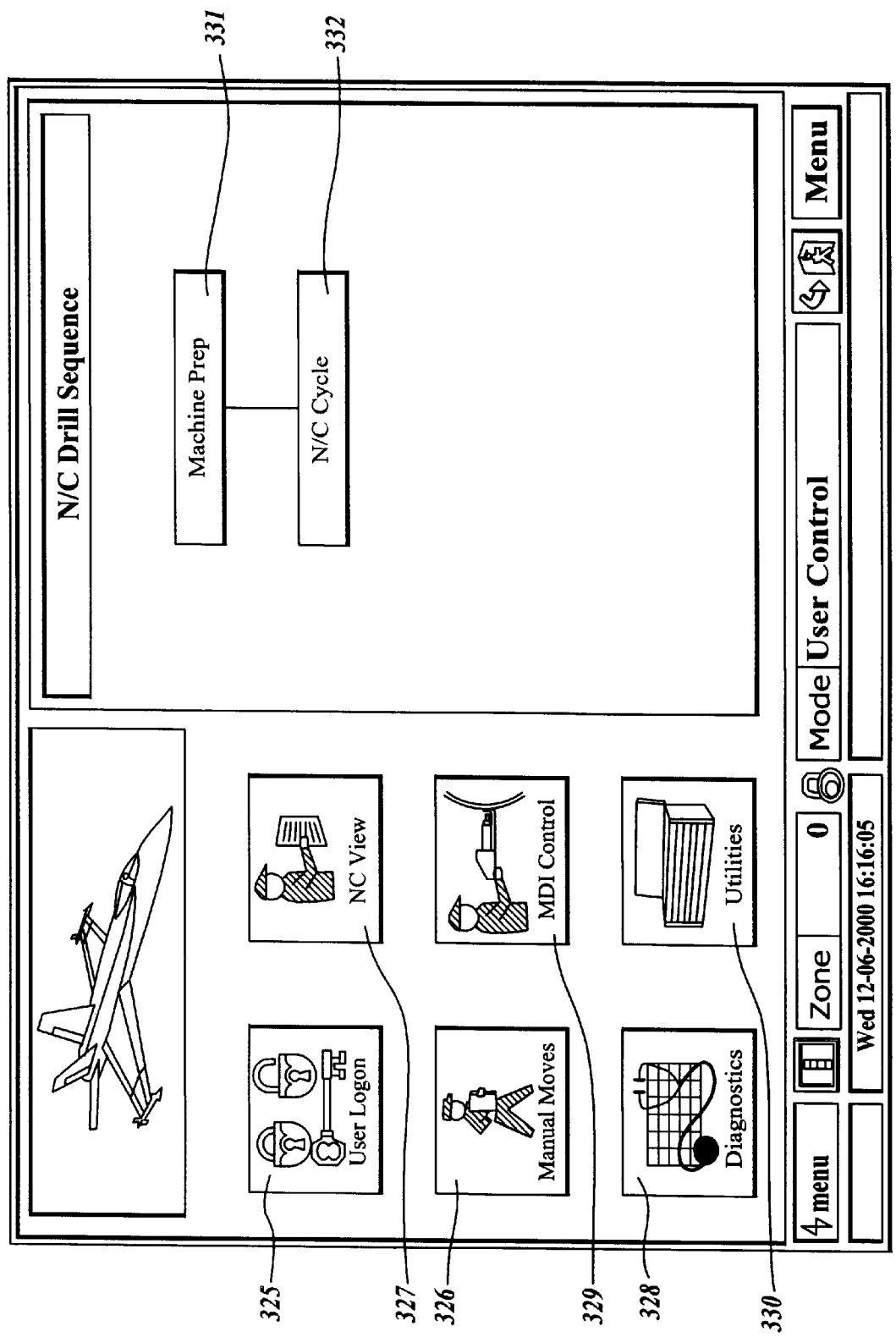
FIG. 25 portrays the display by the graphic user interface at the home screen and portraying the several menus available for navigation through the real-time controller functions.

The operator can control the auxiliary functions of the mini-driller through the pendant. The GUI has a clear hierarchical construct from the home screen FIG. 25. Apparent in FIG. 25 is the user logon screen 325. Other options are also portrayed: manual movement 326; viewing the numeric controller script 327; mini-driller diagnostics 328; MDI control 329; and, the mini-driller utilities 330. Operators find the mini-driller actions easy to control in this operating screen. The panel directs the operator, either, to setting the mini-driller up for operation 331, or to operation 332. Navigation is very easy given this hierarchy. The operator finds mini-driller intuitive to operate. Little training is necessary to produce accurate results.

Figure 26:
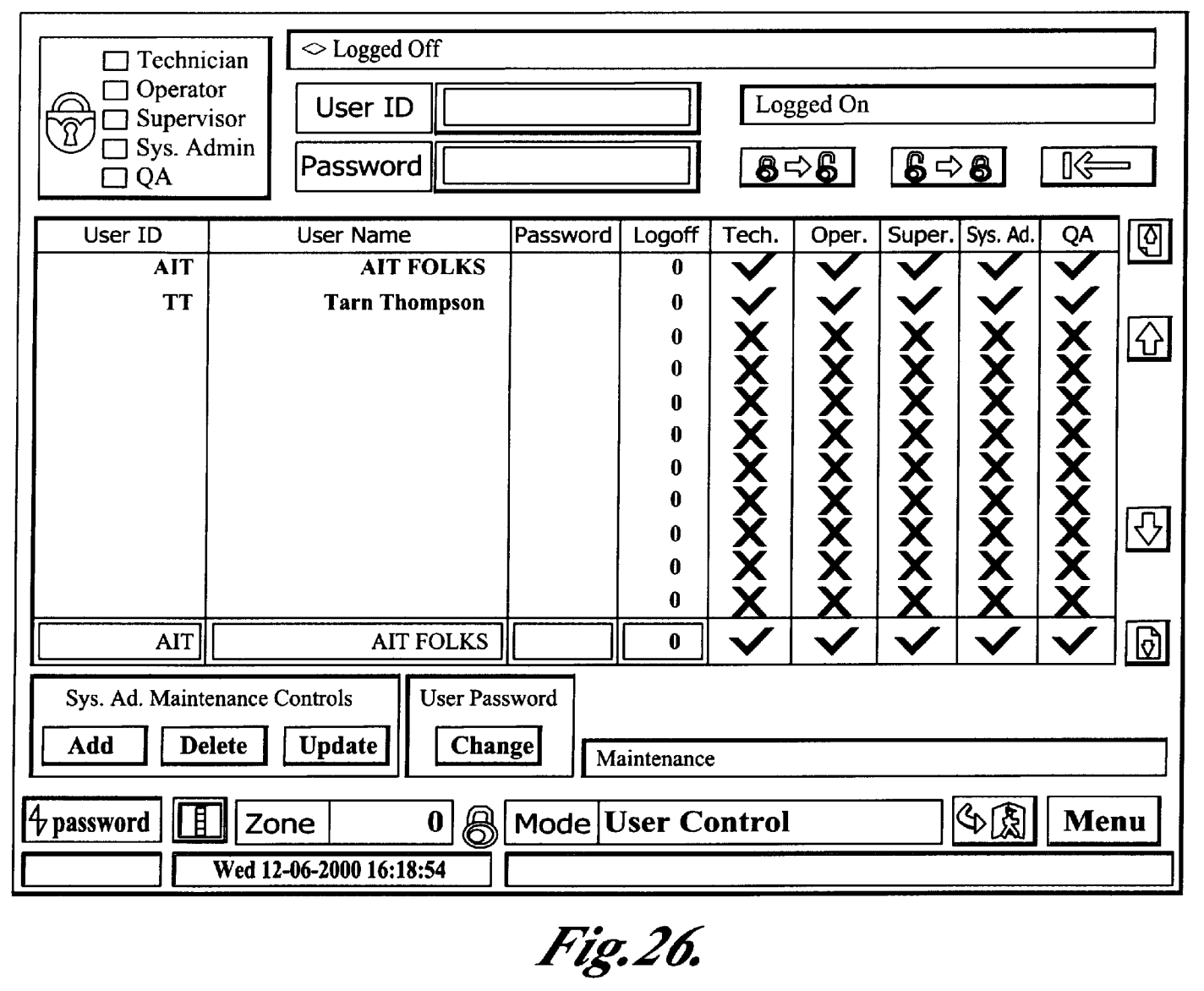
Figure 27:
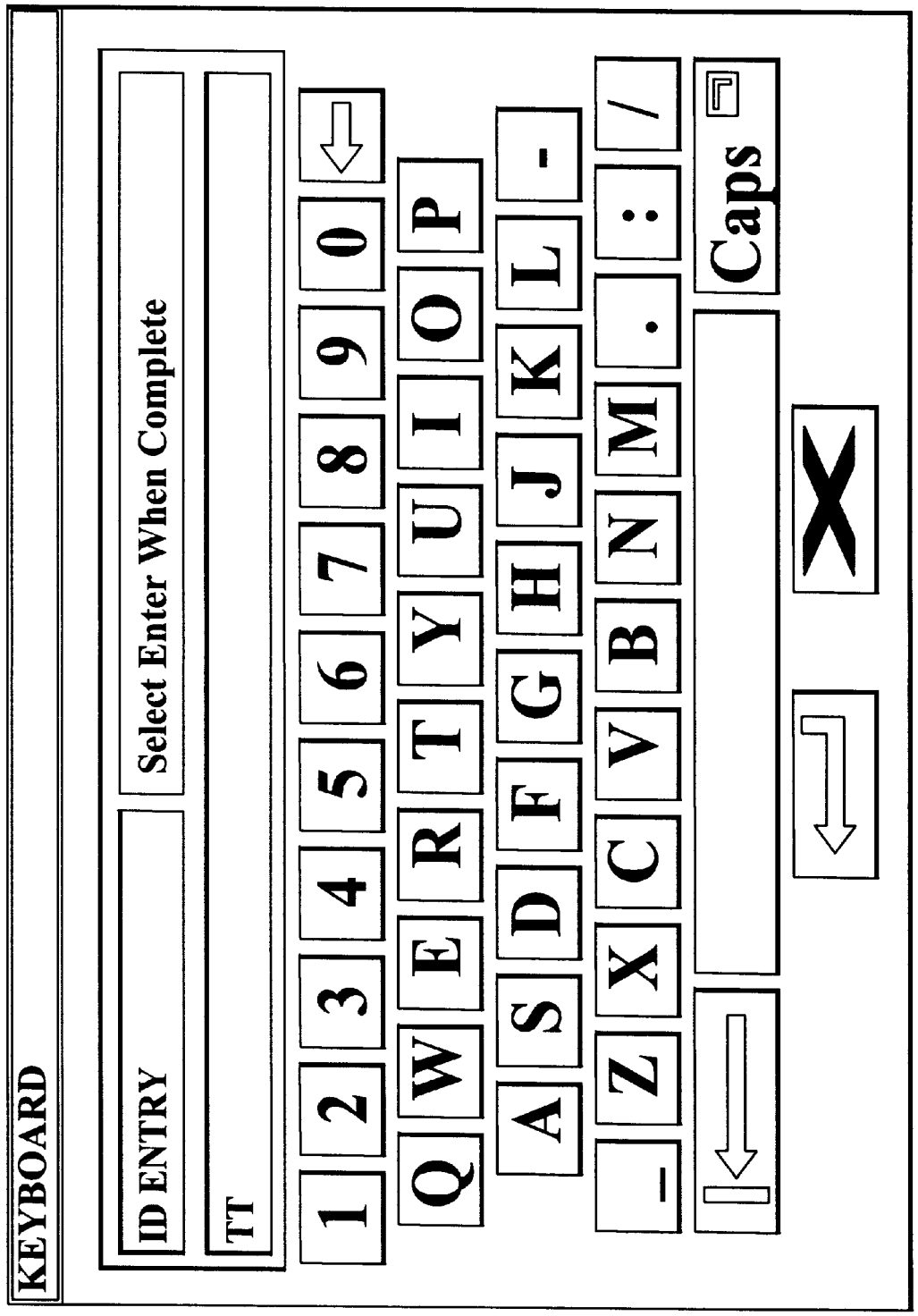
FIG. 27 portrays the "qwerty" style touch screen on the graphic user interface for entry of alphanumeric data.

Two final screens deserve mention. This embodiment includes security features. Operators must log on to the system. Administrators manage passwords much as they might in a networked office setting with computer operating systems. FIG. 26 shows the password management screen. Alphanumeric characters are entered onto the touch sensitive flat screen display with the traditional "qwerty" configuration as shown in FIG. 27.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A drilling system articulable in a plurality of axes for drilling holes for assembly of aircraft comprising:
   a real time controller capable of locating itself in relation to the workpiece;
   a weldment frame;
   an end effecter articulably mounted in the weldment frame allowing articulation about any of the plurality of axes; and
   at least one actuator for each of the plurality of axes, pivotally connected on one end to the weldment frame, on the other end to the end effecter, and electrically connected to the real time controller.

2. The system of claim 1 wherein the plurality of axes comprises three axes.

3. The system of claim 1 wherein the plurality of axes comprises four axes.

4. The system of claim 1 wherein the plurality of axes comprises five axes.

5. The system of claim 1 wherein the plurality of axes comprises at least five axes.

6. The system of claim 1 wherein the real time controller additionally comprises:
   a. a server containing information locating hole sites;
   b. a network connection communicatively connecting the server and the real time controller.

7. The system of claim 6 wherein the network connection is by Local Area Network.

8. The system of claim 6 wherein the network connection is by Wide Area Network.

9. The system of claim 6 wherein the network connection is by Wireless Area Network.

10. The system of claim 6 wherein the network connection is by Fiber Optic Network.

11. The system of claim 6 wherein the network connection is by Radio Frequency Network.

12. The system of claim 1 wherein the end effecter comprises a sensor for locating the end effecter relative to the workpiece communicatively connected to the real time controller.

13. The system of claim 12 wherein the sensing means is a camera.

14. The system of claim 12 wherein the sensing means is a sonar transducer.

15. The system of claim 12 wherein the sensing means is a deformable elastomer and pressure sensing means.

16. The system of claim 12 wherein the sensing means is a sensing stick.

17. A method of locating an end effecter of a multi-axis drilling in relation to a workpiece comprising:
   providing a multiple axis drilling machine with a real time controller;
   determining the position of the multiple axis drilling machine in relation to the workpiece;
   retrieving hole site information; and drilling holes in sites indicated in the hole site information.

18. The method of claim 17 wherein the retrieving of hole site information additionally comprises the steps of:
   a. providing a server wherein hole site information resides;
   b. providing a communications network enabling communication between the server and the real time controller;
   c. requesting the hole site information from the server over the communications network; and
   d. receiving the hole site information from the server.

19. The method of claim 17 wherein the determining the position of the multiple axis drilling machine comprises:
   a. providing a user interface; and
   b. entering position information through the user interface.

20. The method of claim 17 wherein the determining the position of the multiple axis drilling machine comprises:
   a. providing a camera;
   b. directing the camera to the workpiece surface;
   c. imaging the workpiece surface; and
   d. comparing the workpiece surface to hole site information to establish position relative to workpiece.

21. The method of claim 17 wherein the drilling holes in sites indicated by hole site information comprises:
   a. calculating the position of the multiple-axis drilling machine relative to the workpiece;
   b. transforming the hole site information mathematically to assure proper placement of hole sites.

* * * * *

UNITED STATES PATENT AND TRADEMARK OFFICE
CERTIFICATE OF CORRECTION

PATENT NO.    : 6,419,426 B1                                           Page 1 of 1
DATED         : July 16, 2002
INVENTOR(S)   : Chalupa et al.

It is certified that error appears in the above-identified patent and that said Letters Patent is hereby corrected as shown below:

<u>Column 1,</u>
Line 22, please change the mispelled word "modem" to -- modern --.

Signed and Sealed this

Eighth Day of April, 2003

JAMES E. ROGAN
*Director of the United States Patent and Trademark Office*